(12) United States Patent
Lee et al.

(10) Patent No.: US 12,711,175 B2
(45) Date of Patent: Aug. 18, 2026

(54) VIDEO RETRIEVAL METHOD AND APPARATUS USING VECTORIZING SEGMENTED VIDEOS

(71) Applicant: Twelve Labs, Inc., Seattle, WA (US)

(72) Inventors: Seung Joon Lee, Seoul (KR); Sung Jun Kim, Seoul (KR); Raehyuk Jung, Seoul (KR); Haram Jo, Jeollanam-do (KR)

(73) Assignee: Twelve Labs, Inc., San Francisco, CA (US)

( * ) Notice: Subject to any disclaimer, the term of this patent is extended or adjusted under 35 U.S.C. 154(b) by 744 days.

(21) Appl. No.: 17/883,493

(22) Filed: Aug. 8, 2022

(65) Prior Publication Data

US 2023/0281247 A1 Sep. 7, 2023

Related U.S. Application Data

(60) Provisional application No. 63/317,359, filed on Mar. 7, 2022.

(51) Int. Cl.
*G06V 20/40* (2022.01)
*G06F 16/732* (2019.01)
(Continued)

(52) U.S. Cl.
CPC ........ *G06F 16/7837* (2019.01); *G06F 16/732* (2019.01); *G06V 10/82* (2022.01); *G06V 20/46* (2022.01); *G06V 20/49* (2022.01)

(58) Field of Classification Search
CPC .. G06F 16/7837; G06F 16/732; G06F 16/738; G06F 16/7867; G06V 10/82;
(Continued)

(56) References Cited

U.S. PATENT DOCUMENTS

| | | | |
|---|---|---|---|
| 8,645,397 | B1 | 2/2014 | Koudas et al. |
| 2008/0232687 | A1 | 9/2008 | Petersohn |

(Continued)

FOREIGN PATENT DOCUMENTS

| | | | |
|---|---|---|---|
| CN | 104376003 | A | 2/2015 |
| CN | 105654054 | A | 6/2016 |

(Continued)

OTHER PUBLICATIONS

Jiang, Chen, et al. "Learning segment similarity and alignment in large-scale content based video retrieval." Proceedings of the 29th ACM International Conference on Multimedia. 2021. (Year: 2021).*

(Continued)

*Primary Examiner* — Amandeep Saini
*Assistant Examiner* — Denise G Alfonso
(74) *Attorney, Agent, or Firm* — Fenwick & West LLP

(57) ABSTRACT

In order to implement the foregoing object, an exemplary embodiment of the present disclosure discloses a video retrieval method performed by a computing device. The video retrieval method may include: identifying, by a machine learning enabled key frame detecting module having one or more encoders, key frame information for one or more video data based on one or more encoded vectors respectively generated from one or more unit video data contained in the one or more video data; segmenting the one or more video data into one or more target retrieval video data based on the identified key frame information; and generating, by a machine learning enabled retrieval vector generating module having one or more encoders, one or more retrieval video vectors respectively representing the one or more target retrieval video data.

8 Claims, 17 Drawing Sheets

(51) Int. Cl.
*G06F 16/783* (2019.01)
*G06V 10/82* (2022.01)

(58) Field of Classification Search
CPC ........ G06V 20/46; G06V 20/49; G06V 20/48; G06N 20/00; G06N 3/0455
See application file for complete search history.

(56) References Cited

U.S. PATENT DOCUMENTS

| | | | |
|---|---|---|---|
| 2019/0035431 | A1 | 1/2019 | Attorre et al. |
| 2019/0138798 | A1 | 5/2019 | Tang et al. |
| 2021/0097290 | A1 | 4/2021 | Yang et al. |
| 2021/0109966 | A1 | 4/2021 | Ayush et al. |
| 2021/0224550 | A1 | 7/2021 | Zeng et al. |
| 2022/0121636 | A1 | 4/2022 | Zheng et al. |
| 2022/0138489 | A1 | 5/2022 | Ye et al. |
| 2022/0270369 | A1 | 8/2022 | Yu et al. |
| 2022/0277566 | A1 | 9/2022 | Yang et al. |

FOREIGN PATENT DOCUMENTS

| | | | |
|---|---|---|---|
| CN | 107506370 | A | 12/2017 |
| CN | 108228915 | A | 6/2018 |
| CN | 111339369 | A | 6/2020 |
| CN | 111950653 | A | 11/2020 |
| CN | 112395457 | A | 2/2021 |
| CN | 113656639 | A | 11/2021 |

OTHER PUBLICATIONS

Sun, Xiao, et al. "VSRNet: End-to-end video segment retrieval with text query." Pattern Recognition 119 (2021): 108027. (Year: 2021).*

Lee, Aiden Seungjoon, Hanseok Oh, and Minjoon Seo. "ViSeRet: A simple yet effective approach to moment retrieval via fine-grained video segmentation." arXiv preprint arXiv:2110.05146 (2021). (Year: 2021).*

Fu, Tsu-Jui, et al. "Violet: End-to-end video-language transformers with masked visual-token modeling." arXiv preprint arXiv: 2111.12681 (2021). (Year: 2021).*

Liu, Yuqi, et al. "Ts2-net: Token shift and selection transformer for text-video retrieval." European conference on computer vision. Cham: Springer Nature Switzerland, 2022. (Year: 2022).*

Chen, S., et al., "Shot Contrastive Self-Supervised Learning for Scene Boundary Detection," Proceedings of the IEEE/CVF Conference on Computer Vision and Pattern Recognition (CVPR), 2021, pp. 9796-9805.

Dosovitskiy, A., et al., "An Image is Worth 16×16 Words: Transformers for Image Recognition at Scale," arXiv preprint arXiv:2010.11929, 2020, 22 pages.

Gabeur, V., et al., "Multi-modal transformer for video retrieval," Computer Vision-ECCV 2020: 16th European Conference, Glasgow, UK, Aug. 23-28, 2020, Proceedings, Part IV 16, 18 pages.

Shou, MZ, et al., "Generic event boundary detection: A benchmark for event segmentation," *Proceedings of the IEEE/CVF International Conference on Computer Vision,* 2021, pp. 8075-8084.

Souček, T., et al., "Transnet V2: an effective deep network architecture for fast shot transition detection," arXiv preprint arXiv:2008.04838 (2020), 4 pages.

Vaswani, A., et al., "Attention Is All You Need," 31st Conference on Neural Information Processing Systems (NIPS 2017 NIPS), 15 pages.

United States Office Action, U.S. Appl. No. 17/883,489, Apr. 21, 2023, 14 pages.

United States Office Action, U.S. Appl. No. 17/883,489, Nov. 16, 2023, 21 pages.

Sun, X. et al., "VSRNet: End-to-end video segment retrieval with text query," Pattern Recognition, vol. 119, May 23, 2021, pp. 1-10.

Sze, K-W. et al., "A New Key Frame Representation for Video Segment Retrieval," IEEE Transactions on Circuits and Systems for Video Technology, vol. 15, No. 9, Sep. 2005, pp. 1148-1155.

Yan, X. et al., "Deep Keyframe Detection in Human Action Videos," arXiv:1804.10021v1, Apr. 26, 2018, pp. 1-10.

Yan, X. et al., "Self-Supervised Learning to Detect Key Frames in Videos," Sensors, vol. 20, Dec. 4, 2020, pp. 1-18.

Zhong, Q. et al., "Key Frame Extraction Algorithm of Motion Video Based on Priori," IEEE Access, vol. 8, Sep. 22, 2020, pp. 174424-174436.

Ministry of Intellectual Property, Korean Patent Application No. 9-5-2026-023975527, Mar. 11, 2026, 12 pages (translation included).

United States Office Action, U.S. Appl. No. 17/883,483, dated Apr. 18, 2025 10 pages.

United States Office Action, U.S. Appl. No. 18/783,367, dated Nov. 18, 2025, 6 pages.

Ministry of Intellectual Property, Korean Patent Application No. 10-2023-0029505, Mar. 11, 2026, 13 pages (translation included).

Ministry of Intellectual Property, Korean Patent Application No. 10-2023-0029504, Mar. 11, 2026, 12 pages (translation included).

* cited by examiner $t_1$
$t_2$
$t_3$
$t_4$
2231A
2231B
2231C
2231N s220 s221

Figure 14:
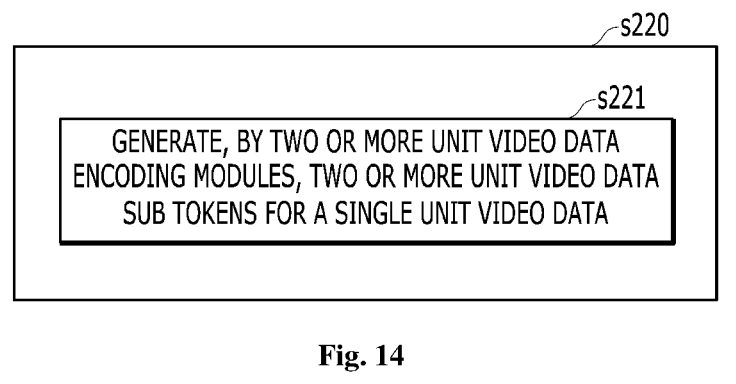

GENERATE, BY TWO OR MORE UNIT VIDEO DATA ENCODING MODULES, TWO OR MORE UNIT VIDEO DATA SUB TOKENS FOR A SINGLE UNIT VIDEO DATA

Figure 15:
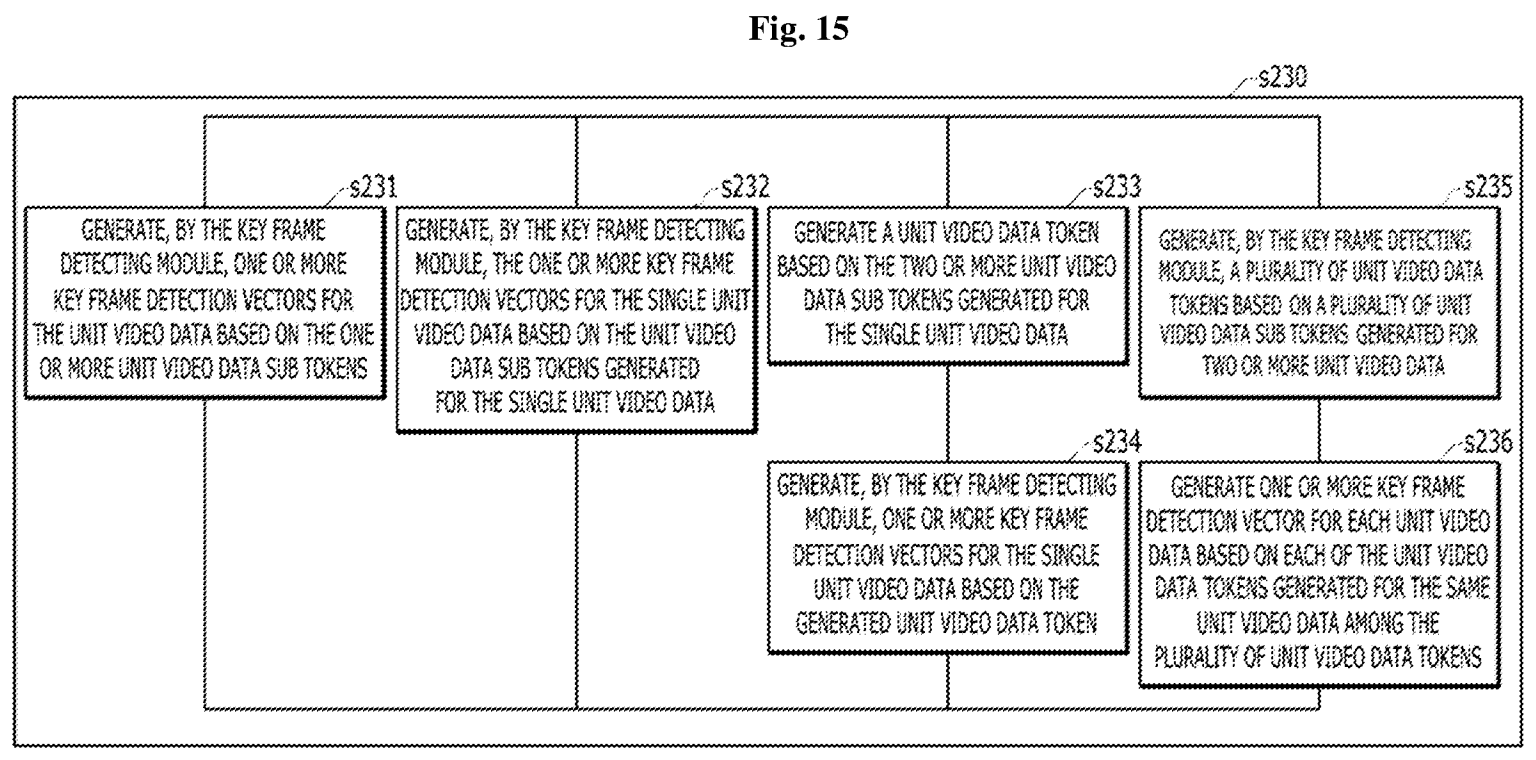

S231: GENERATE, BY THE KEY FRAME DETECTING MODULE, ONE OR MORE KEY FRAME DETECTION VECTORS FOR THE UNIT VIDEO DATA BASED ON THE ONE OR MORE UNIT VIDEO DATA SUB TOKENS

S232: GENERATE, BY THE KEY FRAME DETECTING MODULE, THE ONE OR MORE KEY FRAME DETECTION VECTORS FOR THE SINGLE UNIT VIDEO DATA BASED ON THE UNIT VIDEO DATA SUB TOKENS GENERATED FOR THE SINGLE UNIT VIDEO DATA

S233: GENERATE A UNIT VIDEO DATA TOKEN BASED ON THE TWO OR MORE UNIT VIDEO DATA SUB TOKENS GENERATED FOR THE SINGLE UNIT VIDEO DATA

S234: GENERATE, BY THE KEY FRAME DETECTING MODULE, ONE OR MORE KEY FRAME DETECTION VECTORS FOR THE SINGLE UNIT VIDEO DATA BASED ON THE GENERATED UNIT VIDEO DATA TOKEN

S235: GENERATE, BY THE KEY FRAME DETECTING MODULE, A PLURALITY OF UNIT VIDEO DATA TOKENS BASED ON A PLURALITY OF UNIT VIDEO DATA SUB TOKENS GENERATED FOR TWO OR MORE UNIT VIDEO DATA

S236: GENERATE ONE OR MORE KEY FRAME DETECTION VECTOR FOR EACH UNIT VIDEO DATA BASED ON EACH OF THE UNIT VIDEO DATA TOKENS GENERATED FOR THE SAME UNIT VIDEO DATA AMONG THE PLURALITY OF UNIT VIDEO DATA TOKENS

VIDEO RETRIEVAL METHOD AND APPARATUS USING VECTORIZING SEGMENTED VIDEOS

CROSS REFERENCE TO RELATED APPLICATIONS

This application claims the benefit of and claims priority to U.S. provisional application No. 63/317,359, filed on Mar. 7, 2022, which is incorporated herein by reference in its entirety.

TECHNICAL FIELD

The present disclosure relates to a computer technology field, and particularly, to a method and an apparatus for performing retrieval of video data.

BACKGROUND ART

Video data occupies 80% of the currently generated data. The video data is atypical multi-modal data containing not only visual data but also non-visual data, such as audio data, text data, and semantic data based on the interaction of objects in the video.

In order to retrieve information contained in the video, conventional retrieval methods rely on hashtags or keyword added by humans or contained in video titles and descriptions. Conventional methods can cause waste of a lot of time and costs in processing exponentially increasing amount of video data, and the quality of the retrieval depends on the reliability of information included in hashtags, video titles, and descriptions.

Accordingly, there is a demand for a video retrieval technology that is capable of comprehensively recognizing and processing various information, such as video and temporal context, stepping forward from the existing video retrieval technology specialized for visual information.

SUMMARY OF THE INVENTION

The present disclosure has been conceived in response to the foregoing background art, and has been made in an effort to provide a method and an apparatus performing Video Retrieval (VR) work and Video Corpus Moment Retrieval (VCMR) work.

In order to implement the foregoing object, an exemplary embodiment of the present disclosure discloses a video retrieval method performed by a computing device. The video retrieval method may include: identifying, by a machine learning enabled key frame detecting module having one or more encoders, key frame information for one or more video data based on one or more encoded vectors respectively generated from one or more unit video data included in the one or more video data; segmenting the one or more video data into one or more target retrieval video data based on the identified key frame information; and generating, by a machine learning enabled retrieval vector generating module having one or more encoders, one or more retrieval video vectors respectively representing the one or more target retrieval video data.

Alternatively, the one or more retrieval video encoding modules may generate one or more retrieval video embedding tokens corresponding to one or more retrieval video data, respectively, for the one or more segmented target retrieval video data.

Alternatively, the one or more retrieval video encoding modules may generate two or more retrieval video embedding tokens based on the same data domain included in the one or more target retrieval video data.

Alternatively, the one or more retrieval video encoding modules may generate two or more different domain-based retrieval video embedding tokens based on two or more data domains included in the one or more target retrieval video data.

Alternatively, the generating of the retrieval video vector may include dividing each of the one or more segmented target retrieval video data into a plurality of unit retrieval video data.

Alternatively, the generating of the retrieval video vector may include generating a temporal embedding token based on time information included in each of the plurality of unit retrieval video data.

Alternatively, the video retrieval method may further comprise: storing one or more retrieval video vectors corresponding to the target retrieval video data in a video retrieval index database.

In order to implement the foregoing object, an exemplary embodiment of the present disclosure discloses a non-transitory computer readable storage medium storing a computer program. When the computer program is executed in one or more processors, the computer program causes the one or more processors to perform operations for performing a video retrieval method, and the video retrieval method may include: identifying, by a machine learning enabled key frame detecting module having one or more encoders, key frame information for one or more video data based on one or more encoded vectors respectively generated from one or more unit video data included in the one or more video data; segmenting the one or more video data into one or more target retrieval video data based on the identified key frame information; and generating, by a machine learning enabled retrieval vector generating module having one or more encoders, one or more retrieval video vectors respectively representing the one or more target retrieval video data.

In order to implement the foregoing object, an exemplary embodiment of the present disclosure discloses a computing device performing a video retrieval method. The device may include: a processor including at least one core; and a memory including program codes executable in the processor, in which the processor may identifies, by a machine learning enabled key frame detecting module having one or more encoders, key frame information for one or more video data based on one or more encoded vectors respectively generated from one or more unit video data included in the one or more video data, segments the one or more video data into one or more target retrieval video data based on the identified key frame information, and generates, by a machine learning enabled retrieval vector generating module having one or more encoders, one or more retrieval video vectors respectively representing the one or more target retrieval video data.

The present disclosure may provide the method and the apparatus for performing Video Retrieval (VR) work and Video Corpus Moment Retrieval (VCMR) work.

BRIEF DESCRIPTION OF THE DRAWINGS

FIG. 14 is an exemplary flowchart illustrating the operation of the generating of the unit video data encoding token according to an exemplary embodiment of the present disclosure.

FIG. 15 is an exemplary flowchart illustrating the operation of the generating of the key frame detection vectors according to an exemplary embodiment of the present disclosure.

DETAILED DESCRIPTION

Figure 1:
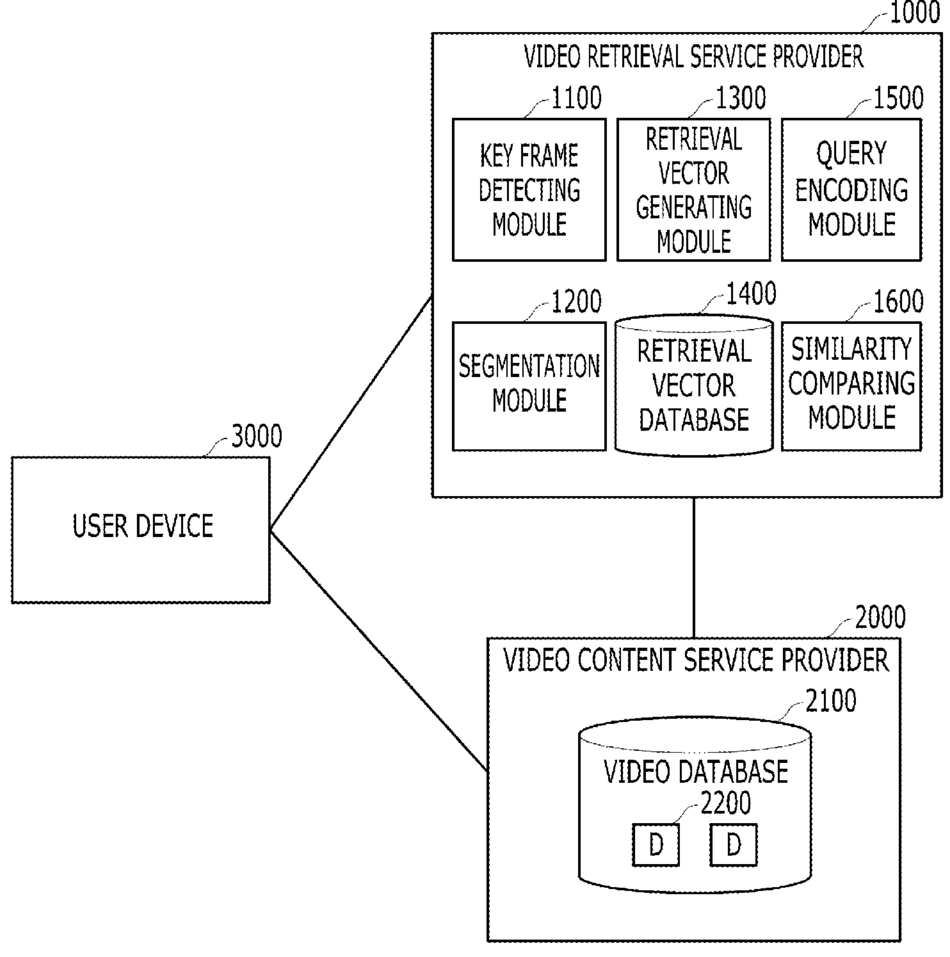
FIG. 1 is a system architecture diagram illustrating a system for providing a video retrieval function according to an exemplary embodiment of the present disclosure.

Various exemplary embodiments are described with reference to the drawings. In the present specification, various descriptions are presented for understanding the present disclosure.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or", not exclusive "or". That is, unless otherwise specified or when it is unclear in context, "X uses A or B" intends to mean one of the natural comprehensive substitutions. That is, when X uses A, X uses B, or X uses both A and B, or "X uses A or B" may be applied to any one among the cases. Further, a term "and/or" used in the present specification shall be understood to designate and include all of the possible combinations of one or more items among the listed relevant items.

It should be understood that a term "include" and/or "including" means that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear in context that a single form is indicated, the singular shall be construed to generally mean "one or more" in the present specification and the claims.

The term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, such implementation decisions should not be interpreted as causing a departure from the scope of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, a network function, an artificial neural network, and a neural network may be interchangeably used.

Throughout this specification, the terms "vector" or "feature vector" may refer to data types for expressing in an operable form by modules according to an embodiment of the present invention in an original expression of data. A vector may refer to any multidimensional phenotype for expressing features of data that cannot be expressed in a single quantity. For example, in an embodiment of the present invention, data types such as a target retrieval video and a retrieval query may be converted into a vector form having a multidimensional value by the modules according to an embodiment of the present invention. A vector expression method and the number of dimensions of a video retrieval vector 1410, a retrieval query vector 1520, etc. can be efficiently selected by an ordinary person skilled in the art, and the present invention is not limited thereto.

FIG. 1 is a system architecture diagram illustrating a system for providing a video retrieval function according to an exemplary embodiment of the present disclosure.

In the exemplary embodiment, a video retrieval service provider 1000, a video content service provider 2000, and a user device 3000 may be communicatively connected to each other to provide a video retrieval service to a user (not illustrated). The constituent elements of a system illustrated in FIG. 1 is merely an example of a system for providing a video retrieval function according to the exemplary embodiment of the present disclosure, and more or fewer constituent elements and/or entities than those illustrated in FIG. 1 may configure the video retrieval system in order to provide the video retrieval function.

In the exemplary embodiment of the present disclosure, the entity illustrated in FIG. 1 or the modules illustrated to be included in the entity may mean function modules performed by a series of software codes performed by a processor. In another exemplary embodiment, the entity or the modules illustrated to be included in the entity may mean one or more processors allocated to perform functions of the corresponding entity and module.

The processor may be formed of one or more cores, and may include a processor, such as a central processing unit (CPU), a graphics processing unit (GPU), and a tensor processing unit (TPU) of the computing device, for performing a data analysis and deep learning. The processor may read a computer program stored in a memory and perform data processing for machine leaning according to the exemplary embodiment of the present disclosure. According to the exemplary embodiment of the present disclosure, the processor may perform computations for training one or more neural networks. The processor may perform calculations, such as processing of input data for training in Deep Learning (DL), extraction of a feature from input data, an error calculation, and updating of a weight of the neural network by using backpropagation, for training the neural network. At least one of the CPU, GPGPU, and TPU of the processor may process training of the network function. For example, the CPU and the GPGPU may process training of the network function and data classification by using a network function together. Further, in the exemplary embodiment of the present disclosure, the training of the network function and the data classification by using a network function may be processed by using the processors of the plurality of computing devices together. Further, the computer program executed in the computing device according to the exemplary embodiment of the present disclosure may be a CPU, GPGPU, or TPU executable program.

In the exemplary embodiment of the present disclosure, databases 1400 and 2100 illustrated in FIG. 1 may be stored in a memory and implemented. In the present specification, the database may mean a logical interrelationship between cross-referenced data. Otherwise, the database may also mean a storage space within a memory in which data is physically stored.

According to the exemplary embodiment of the present disclosure, the memory may store a predetermined type of information generated or determined by the processor or a predetermined type of information received by a network interface. For example, the memory may store sub video data, retrieval video data, unit video data, a key frame detection vector, a unit video encoding token, and the like generated by the processor as explained hereinbelow.

According to the exemplary embodiment of the present disclosure, the memory may be storage medium storing computer software that causes the processor to perform the operation according to the exemplary embodiments of the present disclosure.

Accordingly, the memory does not mean only the module referred to as a database in FIG. 1, and may also be computer readable media for storing software code, data that is an execution target of the code, and an execution result of the code required for performing the entity and modules disclosed in FIG. 1.

According to the exemplary embodiment of the present disclosure, the memory may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk. The computing device may also be operated in relation to web storage performing a storage function of the memory on the Internet. The description of the foregoing memory is merely illustrative, and the present disclosure is not limited thereto.

According to the exemplary embodiment of the present disclosure, the entity or modules illustrated in FIG. 1 may include a network unit that communicates with each other by using a predetermined type of wired/wireless communication system.

The network unit may transceive (e.g., transmit and/or receive) information processed by the processor, a user interface, and the like with another terminal through communication. For example, the network unit may provide the user interface generated by the processor to a client (for example, a user terminal). Further, the network unit may receive an external input of a user applied to the client and transmit the received external input to the processor. In this case, the processor may process operations, such as output, modification, change, and addition, of information provided through the user interface based on the external input of the user received from the network unit.

In particular, for example, the network unit may transceive various information for performing a video retrieval method according to exemplary embodiments of the present disclosure. For example, the network unit of the video retrieval service provider 1000 may receive one or more target retrieval video data 2200 stored in a video database 2100 of the video content service provider 2000. Further, the network unit of the video retrieval service provider 1000 or the video content service provider 2000 may receive target retrieval video data generated in real time in the user device 3000. Further, the network may receive a retrieval query for video retrieval. Further, the network may perform a video retrieval method on target retrieval video data stored in an external device. Further, the network may transmit video information identified by a retrieval query to other devices.

In the meantime, the computing device and/or entities according to the exemplary embodiment of the present disclosure are computing systems transceiving information through communication with a client, and may include a server. In this case, the client may be a predetermined form of terminal accessible to the server.

The video retrieval service provider 1000 may include a key frame detecting module 1100, a segmentation module 1200, a retrieval vector generating module 1300, a retrieval vector database 1400, a query encoding module 1500, and a similarity comparing module 1600. The key frame detecting module 1100 may extract information related to a frame in which visual or non-visual information is changed by a threshold value or more within video data that is a retrieval target. For example, to the key frame detecting module 1100 may identify a frame in which an image between the frame and a previous frame (or a set of previous frames) is changed because a background or characters within the frames are visually changed or a semantic relationship between objects within a video is changed. For another example, the key frame detection module 1100 may identify information about a frame corresponding to a time point at which non-visual information, for example, a new topic mentioned with a voice, is generated or a new type of continuous sound (for example, background music or sound effect) is added or ended in the video. A more detailed explanation of the operation of the key frame detecting module 1100 is described below with reference to FIGS. 6 and 7A-B.

The segmentation module 1200 may receive the information identified in the key frame detecting module 1100, and segment the video data in time based on the received information. The operation of segmenting the video data may mean an operation of dividing a video into one or more segmented videos over time.

In the exemplary embodiment of the present disclosure, the segmenting operation may mean an operation of generating a plurality of segmented videos (for example, a first video with a time duration of 0 to 20 s, a second video with a time duration of 20 to 50 s, and a third video with a time duration of 50 to 100 s) that do not overlap with each other and are adjacent to each other within one video (for example, a video with playback start time of 0 s and a play back end time of 100 s). In the exemplary embodiment, a sum of segmented videos may be the same as the entire video.

In another exemplary embodiment of the present disclosure, the segmentation operation may mean an operation of generating a plurality of videos that overlap and are adjacent to each other. In another exemplary embodiment, a sum of all of the segmented videos may include only at least a part of the total videos. For example, the video may be segmented for the remaining time duration excluding a time duration in which the retrieval is not desired for reasons, such as non-existence of information to be retrieved or not allowing the retrieval for confidentiality. For example, for the video with the total video time duration of 0 to 100 s, a first video with a time duration of 0 to 25 s, a second video with a time duration of 20 s to 50 s, and a third video with a time duration of 60 s to 100 s may be generated.

In still another exemplary embodiment, the segmentation operation may mean an operation of generating one segmented video across two or more different videos. For example, a video from one time point to an end time point of video A and a video from a start time point to one time point of video B may constitute one segmented video. The segmented video across the two or more videos may consist of a sum of videos that do not include the start or end time points of two or more videos.

The particular exemplary embodiment in which the segmentation module 1200 segments the video will be described below with reference to FIGS. 8A and 8B in detail.

The retrieval vector generating module 1300 may receive information about the segmented video from the segmentation module 1200 and generate one or more video retrieval vectors for the segmented video. The retrieval vector generating module 1300 may generate a video retrieval vector representing the segmented video based on one or more data domains (for example, visual-based data, audio-based data, and text-based data) for the segmented video. The retrieval vector generating module 1300 may generate at least one video retrieval vector for the segmented video. A more detailed explanation of the operation of the retrieval vector generating module 1300 is described below with reference to FIGS. 9-10.

The retrieval vector database 1400 may store the video retrieval vectors generated by the retrieval vector generating module 1300. In FIG. 1, the retrieval vector database 1400 is illustrated to exist in the video retrieval service provider 1000, but the present disclosure is not limited thereto. In another exemplary embodiment, the retrieval vector database 1400 may exist in a device (for example, the video content service provider 2000 or the user device 3000) outside the video retrieval service provider 1000 or a plurality of database servers constituting cloud storage.

The query encoding module 1500 may receive a retrieval query for retrieving a video and generate a retrieval query vector. The retrieval query vector may be generated in a form that is mutually computable with the video retrieval vector. The retrieval query vector may be a transformation of a retrieval query input by a user into a form that can match the features of the retrieval video data generated according to an embodiment of the present disclosure. For example, the retrieval query may be text data, and may be "video of men and women drinking coffee". The retrieval video data generated according to an embodiment of the present disclosure cannot be matched or compared with such a text-type retrieval query to determine a similarity. As described above, the retrieval video database 1400 may convert and store the features of the retrieval video data 2230 into a vectorized form using the retrieval vector generating module 1300. Therefore, the input retrieval query "video of men and women drinking coffee" must be converted into an operable form with the video retrieval vector 1410 stored in the retrieval vector database 1400. As described above, the query encoding module 1500 may include some or all of the components of the retrieval vector generating module 1300 in converting a retrieval query into a retrieval query vector 1520. In another embodiment, the query encoding module 1500 is configured differently from the retrieval vector generating module 1300, but may also generate a retrieval query vector in a form operable with the retrieval query vector 1520. The above-mentioned retrieval query is presented for explanation, and the retrieval query may be configured in various forms other than text (e.g., image, short clip, sound information including voice or sound, and combinations thereof). The similarity comparing module 1600 may compare the retrieval query vector and two or more video retrieval vectors and identify the video retrieval vector that is most similar to the retrieval query vector. The similarity comparing module 1600 may use similarity determining methods, such as cosine similarity, Euclidean Distance, Jaccard similarity, and Levenshtein distance, between two vectors in order to determine similarity between two or more vectors.

The video retrieval service provider 1000 may analyze the stored video, convert the video to a retrieval possible form, and provide the converted video. In order to convert the video to a retrieval possible form, the video retrieval service provider 1000 may generate and store or provide the video retrieval vector 1410 for the video. The video retrieval vector 1410 may be a vector generated by the above-mentioned retrieval vector generating module 1300. The video retrieval service provider 1000 may generate one or more video retrieval vectors for one video.

The video retrieval service provider 1000 may receive a retrieval query for retrieving information within the video and provide video information corresponding to the received query. The video information corresponding to the query provided by the video retrieval service provider 1000 may include a list of videos corresponding to the query, a start time and/or end time within the video corresponding to the query, the degree of matching between the video corresponding to the query and the received query, matching information between the received query and the video data, and the like.

The video retrieval service provider 1000 may provide a video retrieval service in a form of Software as a Service (SaaS) or Application Programming Interface (API). As an example, when a user accesses and inputs a video retrieval query through the user device 3000, the video retrieval service provider 1000 may provide an online service providing video information corresponding to the video retrieval query. As another example, the video retrieval service provider 1000 may provide the video retrieval vector for the video data stored by the video content service provider 2000, or provide video information corresponding to the retrieval query received by the video content service provider 2000 from the user device 3000 through an API to which the video content service provider 2000 is accessible.

The video content service provider 2000 may store video data 2200 in the video database 2100. The video content service provider 2000 may include additional modules that are not illustrated in FIG. 1 for providing a video content service. In an example, the video content service provider 2000 may include a user interface (not illustrated) communicating with the user device 3000, and may additionally include a communication module (not illustrated) for communicating with the API of the video retrieval service provider 1000 and content delivery networks (not illustrated) for providing the requested video content to the user device 3000.

The video database 2100 of the video content service provider 2000 may also be implemented in a local memory possessed by the video content service provider 2000, or may be distributed and stored in cloud storage outside the video content service provider 2000.

The user device 3000 may transmit the retrieval query to the video retrieval service provider 1000 or the video content service provider 2000, and receive video information corresponding to the retrieval query. Even in the case where the information that the user wants to retrieve is stored in the form of a video content, the user may easily retrieve the corresponding information through the user device 3000.

Figure 2:
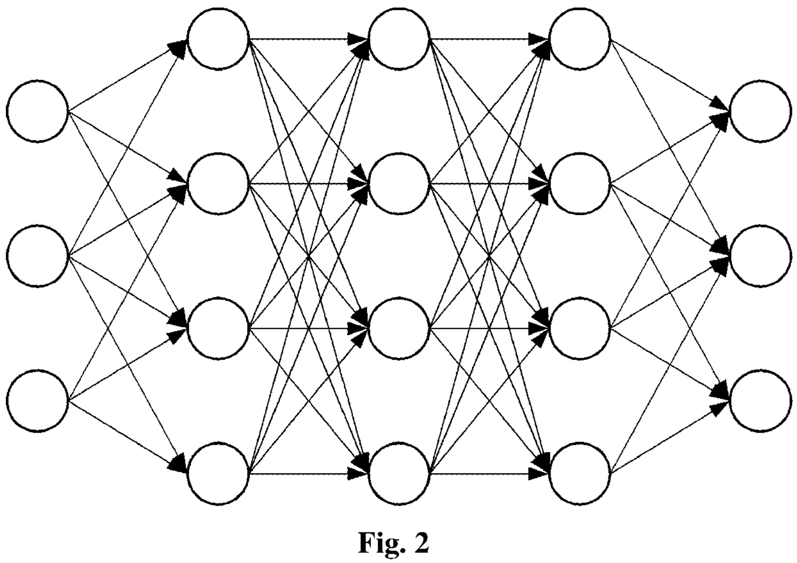
FIG. 2 is a conceptual diagram illustrating a network function according to the exemplary embodiment of the present disclosure.

Some entities illustrated in FIG. 1 may be integrated and implemented by a single entity according to the specific exemplary embodiment, or the functions disclosed as being implemented by the single entity in FIG. 1 may be distributed and performed across multiple entities. The modules included in the entities, respectively, illustrated in FIG. 1 may be included in other entities and perform functions according to the specific exemplary embodiment. For example, in the exemplary embodiment, the video retrieval service provider 1000 may be integrated with the video content service provider 2000 and one entity may provide the function of providing and retrieving the video content to the user device 3000. In another exemplary embodiment, the retrieval vector database 1400 disclosed to be included in the video retrieval service provider 1000 may be included in the video content service provider 2000. Also, some entities disclosed in FIG. 1 may be implemented using network functions described in FIGS. 2 and 3 below. For example, the key frame detection module 1100, the retrieval vector generating module 1300, and the query encoding module 1500 may be machine learning capable modules or include machine learning capable components, each of which will be described in detail below. FIG. 2 is a conceptual diagram illustrating a network function according to an exemplary embodiment of the present disclosure.

Throughout the present specification, the meanings of a calculation model, a nerve network, the network function, and the neural network may be interchangeably used. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer based on distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the exemplary embodiment of the present disclosure, the number of nodes of the input layer may be the same as the number of nodes of the output layer, and the neural network may be in the form that the number of nodes decreases and then increases again from the input layer to the hidden layer. Further, in the neural network according to another exemplary embodiment of the present disclosure, the number of nodes of the input layer may be smaller than the number of nodes of the output layer, and the neural network may be in the form that the number of nodes decreases from the input layer to the hidden layer. Further, in the neural network according to another exemplary embodiment of the present disclosure, the number of nodes of the input layer may be larger than the number of nodes of the output layer, and the neural network may be in the form that the number of nodes increases from the input layer to the hidden layer. The neural network according to another exemplary embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a restricted Boltzmann machine (RBM), a deep belief network (DBN), a Q network, a U network, a Siamese network, a transformer, and the like. The foregoing description of the deep neural network is merely illustrative, and the present disclosure is not limited thereto.

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing or reducing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct or expected answer (that is, labelled training data) is used, in each training data, and in the case of the unsupervised learning, a correct or expected answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. In another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

Figure 3:
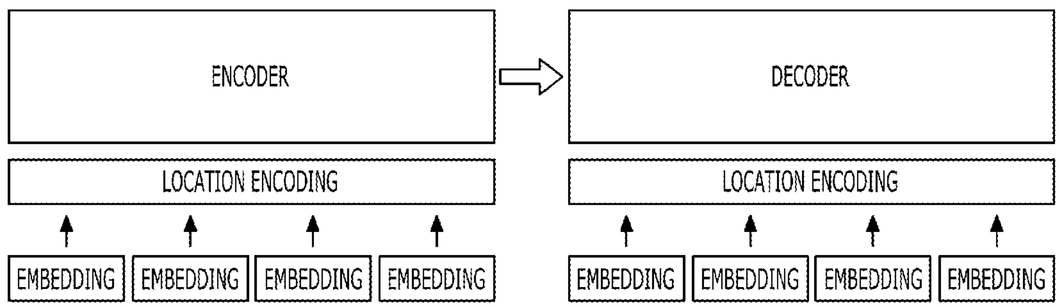
FIG. 3 is a conceptual diagram illustrating an operation of a transformer in a network function according to the exemplary embodiment of the present disclosure.

FIG. 3 is a conceptual diagram illustrating an operation of a transformer in a network function according to the exemplary embodiment of the present disclosure.

A transformer illustrated in FIG. 3 may include an encoder encoding embedded data and a decoder decoding encoded data. The transformer may have a structure that receives a series of data and outputs a series of data of different types through encoding and decoding operations. In the exemplary embodiment, the series of data may be processed in a form computable by the transformer. The process of processing the series of data to the form computable by the transformer may include an embedding process. Expressions, such as data token, embedding vector, and embedding token, may refer to data embedded in the form that is processible by the transformer.

In order for the transformer to encode and decode the series of data, the encoder and decoder within the transformer may be processed by utilizing an attention algorithm. The attention algorithm may mean an algorithm that calculates similarity for one or more keys for a given query, reflects the calculated similarity to a value corresponding to each key, and then calculating an attention value by calculating a weighted sum of the values to which the similarity is reflected.

Various types of attention algorithms may be classified according to how set a query, a key, and a value. For example, when the attention is calculated by setting all of the query, the key, and the value all the same, this may mean a self-attention algorithm. When the attention is calculated by reducing a dimension of the embedding vector and calculating an individual attention head for each divided embedding vector in order to process the input series of data in parallel, this may mean a multi-head attention algorithm.

In the exemplary embodiment, the transformer may include a plurality of modules performing the multi-head self-attention algorithm, or the multi-head encoder-decoder algorithm. In the exemplary embodiment, the transformer may also include additional constituent elements, such as an embedding layer, a normalization layer, and a softmax layer, not in the attention algorithm. The method of configuring the transformer by using the attention algorithm may include the method disclosed in Attention Is All You Need, 2017 NIPS, Vaswani et al., which is incorporated herein as a reference.

The transformer may be applied to various data domains, such as an embedded natural language, the divided image data, and an audio waveform to convert a series of input data to a series of output data. In order to convert data having various data domains to a series of data inputtable to the transformer, the transformer may generate an embedding vector for the data. The transformer may process additional data expressing a relative locational relationship or phase relationship between the series of input data. Otherwise, the vectors expressing the relative locational relationship or phase relationship between the input data are additionally reflected to the series of input data, so that the series of input data may be embedded. In the example, the relative locational relationship between the series of input data may include a word order within a natural language sentence, a relative locational relationship of each divided image, a time order of the divided audio waveforms, and the like, but the present disclosure is not limited thereto. The process of adding information expressing the relative locational relationship or phase relationship between the series of input data may be referred to as positional encoding.

An example of the method of embedding and converting image data by the transformer is disclosed in AN IMAGE IS WORTH 16×16 WORDS: TRANSFORMERS FOR IMAGE RECOGNITION AT SCALE, Dosovitskiy, et al., and the corresponding document is incorporated herein as reference.

Figure 4A:
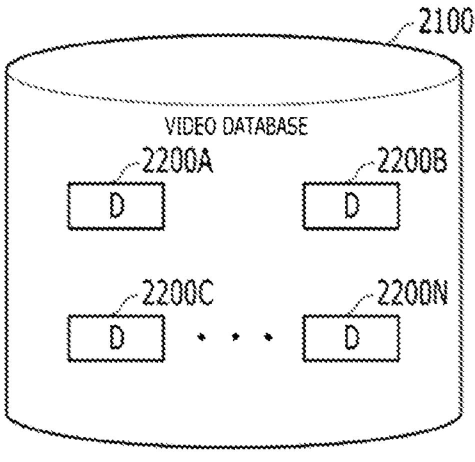
FIGS. 4A and 4B are conceptual diagrams illustrating performance of video retrieval according to the video retrieval method according to the exemplary embodiment of the present disclosure.
Figure 4B:
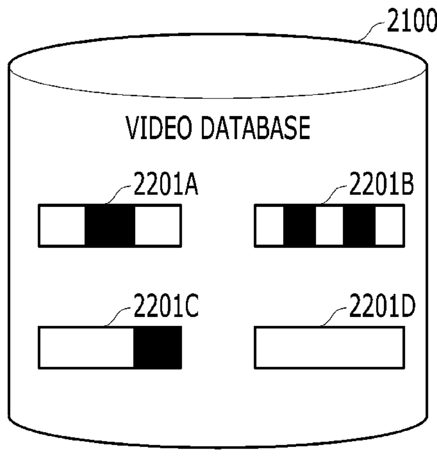

FIGS. 4A and 4B are conceptual diagrams illustrating performance of video retrieval according to the video retrieval method according to the exemplary embodiment of the present disclosure.

As illustrated in FIG. 4A, one or more video data 2200A, 2200B, 2200C, . . . , and 2200N may be stored in the video database 2100. One or more video data 2200A, 2200B, 2200C, . . . , and 2200N may be provided by the video content service provider 2000, may be transmitted from the user device 3000, or may be received from another entity that is not illustrated in FIG. 1.

The video retrieval refers to the task of searching the video with the highest semantic relevance to the input retrieval query among one or more videos. A video corpus moment retrieval may refer to the task of a search moment with the highest semantic relevancy to the input retrieval query among one or more videos.

In the exemplary embodiment of the present disclosure, in order to search for the temporal moment with the highest semantic relevancy to the input query, key frames with high semantic volatility in one or more videos may be identified first. By using time information of the identified key frame (for example, information on a timestamp in which the corresponding key frame is located), one or more videos 2200A, 2200B, 2200C, . . . , and 2200N may be first segmented. In this case, when one or more videos 2200A, 2200B, 2200C, . . . , and 2200N are temporally segmented in the unit of the key frame with the high semantic volatility, each of the segmented videos is more likely to include semantically similar data across the entire video. In this case, the video retrieval vector generated by encoding the segmented videos may represent well the corresponding entire segments. Minimum unit videos suitable for performing the video corpus moment retrieval may be obtained by identifying the key frame and segmenting one or more videos based on the identified key frame. By segmenting the video based on the key frame with the high semantic volatility within the video, the segmented video is formed of semantically homogeneous video data. Accordingly, it is possible to more effectively represent the segmented video with less information (for example, fewer video retrieval vectors or smaller dimension video retrieval vector).

As illustrated in FIG. 4B, among the plurality of video retrieval vectors generated by encoding the plurality of segmented videos, one or more video retrieval vectors similar to the retrieval query vector generated by encoding the retrieval query may be identified. By using information about the videos 2201A, 2201B, 2201C, and 2201D corresponding to the one or more identified video retrieval query vectors, a position of the moment at which the data that is most semantically similar to the retrieval query exists among the one or more videos and similarity may be confirmed. For example, in each of the videos 2201A to 2201D shown in FIG. 4B, areas colored in black may indicate portions of the video matching the input retrieval query 1510. In an example, the areas colored in black may indicate a result of performing a VCMR (Video Corpus Moment Retrieval) task on the videos 2201A-2201D based on the input retrieval query 1510. In another example, the areas colored in black may indicate parts of a video having a high similarity to the input retrieval query based on a separate metric. In an example, the areas colored in black may indicate parts of a video including information with a high similarity to information included in a retrieval query among the entire video. In general, videos (including videos 2201A-2201D) may consist of a combination of information having one or more modalities such as audio and visual information constituting the videos, text information included in audio or visual, and semantic information according to the interaction of objects seen in the videos. The retrieval query 1510 may also consist of information having one or more modalities. The areas colored in black among the entire area of video 2200 may be interpreted as including information having a high degree of similarity to at least one information or a combination of two or more information among the multimodality information of the video. Specific methods for finding pairs (high similarity) that mutually match a retrieval query data 1510 in videos 2200 are described throughout this specification.

Figure 5:
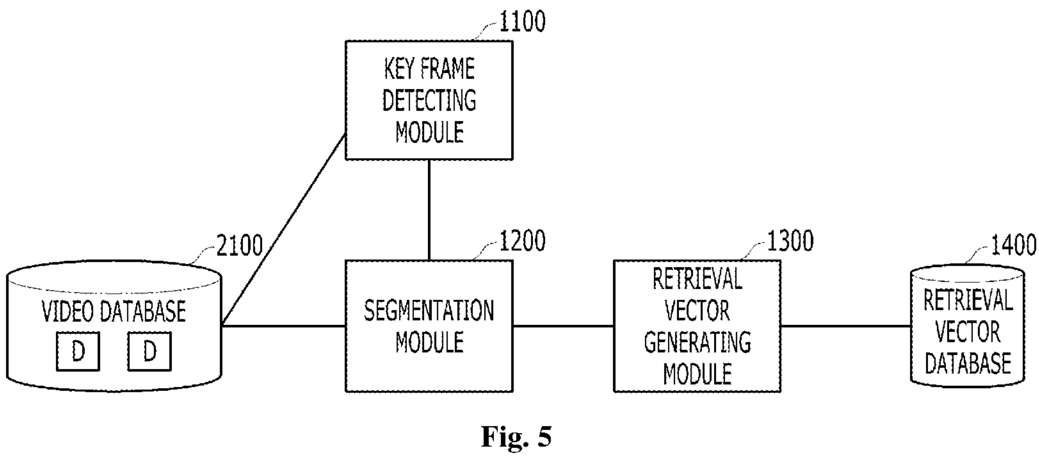
FIG. 5 is a block diagram illustrating a part of a video retrieval service provider according to the exemplary embodiment of the present disclosure.

FIG. 5 is a block diagram illustrating a part of the video retrieval service provider 1000 according to the exemplary embodiment of the present disclosure.

As illustrated in FIG. 5, the video data 2200 may be transmitted to the key frame detecting module 1100. The video data 2200 may refer to one video among one or more video data 2200 stored in the video database 2100. The one or more video data 2200 that is the retrieval target may be sequentially input to the video retrieval service provider 1000 presented in FIG. 5, and the video retrieval service provider may sequentially process one or more videos among the video data.

The key frame detecting module 1100 may identify key frame information included in the one or more video data 2200. In the exemplary embodiment, the key frame information may include information about a temporal timestamp in which a frame in which a semantic change is detected by a threshold value or more exists based on the information (for example, image information, audio information, and text information) included in the video data 2200. That is, the key frame information may refer to a playback time of one or more frames identified as the key frame.

The key frame detecting module 1100 may identify one frame as a key frame or two or more continuously disposed frames as a key frame within the video data 2200. For example, the key frame detecting module 1100 may identify one frame of which the semantic change is equal to or larger than the threshold value, and transmit playback time information of the corresponding frame. In another example, the key frame detecting module 1100 may identify a series of continuous frames of which the semantic change is equal to or larger than the threshold value, and transmit information about a playback section in which the corresponding continuous frames are spanned.

In the exemplary embodiment of the present disclosure, the key frame detecting module 1100 may be configured to process sub video data 2210 with a predetermined length. In this case, the key frame detecting module 1100 may segment the video data 2200 into two or more sub video data 2210 and generate the segmented sub video data. Specifically, the video data 2200 may generally have various playback times from seconds to minutes, hours or days. Therefore, the video data 2200 may be segmented to sub video data 2210 with a predetermined length so that video data 2200 of various sizes may be processed in a plurality of uniform sub-units. Two or more sub video data may mean a series of continuous video data in which the union of the sub video data becomes the same as the video data 2200. For example, when the video data 2200 having the playback time period of one hour is segmented into the sub video data 2210 having the playback time period of predetermined one minute, 60 sub video data (60 sub video data having the playback time periods of 0 to 1 m, 1 to 2 m, . . . , and 59 to 60 m) may be generated. However, this is illustrative, and there are various methods of generating the plurality of sub video data 2210 from one video data 2200. In another exemplary embodiment of the present disclosure, the plurality of sub video data 2210 may partially overlap each other, or may be generated except for one part of the video data 2200.

As described above, the key frame detecting module 1100 may identify the key frame from one or more sub video data 2210. In the exemplary embodiment of the present disclosure, the key frame detecting module 1100 may determine whether each of the frames in the video data 2200 corresponds to the key frame. In another exemplary embodiment of the present disclosure, the key frame detecting module 1100 may determine whether the unit video data 2220 having a predetermined length corresponds to the key frame. For example, the key frame detecting module may determine whether the entire videos divided in the unit of 1 second, 0.5 second, and 0.5 second correspond to the key frame. In this case, each of the video data divided in the unit of one second may be defined as unit video data. The unit video data 2220 may be a minimum unit of video data that may be a key frame. For example, by identifying one or more unit video data corresponding to the key frame among a plurality of the unit video data 2220 constituting the sub video data 2210, it can be identified which part of the sub video data 2210 corresponds to the key frame. The lengths of the sub video data 2210 and the unit video data 2220 are illustrative, and the present disclosure is not limited thereto. The lengths of the sub video data 2210 and the unit video data 2220 may be fixed according to the design of the key frame detecting module 1100. In another exemplary embodiment of the present disclosure, the lengths of the sub video data 2210 and the unit video data 2220 are variable, and the sub video data 2210 and the unit video data 2220 having different length for one video may also be generated.

As described above, the key frame detecting module 1100 may divide one or more sub video data 2210 into the unit video data 2220 again, and determine whether each of the corresponding unit video data 2220 corresponds to the key frame. Information about the frames (or the unit video data 2220) identified to be the key frame by the key frame detecting module 1100 may be transmitted to the segmentation module 1200. The particular method of identifying, by the key frame detecting module 1100, whether the frame corresponds to the key frame will be described below in detail with reference to FIG. 6.

The segmentation module 1200 in the exemplary embodiment of the present disclosure may receive key frame information from the key frame detecting module 1100. The segmentation module 1200 may segment one or more video data 2200 based on time information (for example, timestamp information) of the key frame received from the key frame detecting module 1100. In the exemplary embodiment, the segmentation module 1200 may directly divide the video data 2200 and generate the plurality of segmented retrieval video data 2230.

For example, in order to segment one video data, the segmentation module 1200 may receive the plurality of time information corresponding to the plurality of key frames identified by the key frame detecting module 1100. For example, the plurality of time information may mean timestamps in which the key frames are present during the entire playback time. In another exemplary embodiment, when the key frame detecting module 1100 identifies the continuous frames (for example, the unit video data 2220) having the predetermined length as the key frame, the timestamps may include at least one of a start time and an end time of the identified unit video data 2220. For example, when the length of the unit video data 2220 identified as the key frame is one second and the identified unit video data 2220 in the entire video data 2200 starts at four seconds and ends around 5 seconds, the timestamp may include four seconds, five seconds, or four seconds and five seconds.

The segmentation module 1200 may segment one or more video data 2200 into the retrieval video data 2230 based on the key frame information received from the key frame detecting module 1100 as described above. In the exemplary embodiment, the segmentation module 1200 may segment one or more video data 2200 into the plurality of retrieval video data 2230 having the foregoing timestamps as the start or end time. In the exemplary embodiment, when the key frame detecting module 1100 identifies one frame as the key frame, the timestamps may mean a position in time of the corresponding key frame. In another exemplary embodiment, when the key frame detecting module 1100 identifies the unit video data 2220 as the key frame, the timestamp may include the start and end times of the identified unit video data 2220.

When an interval between the timestamps received from the key frame detecting module 1100 exceeds a predetermined length, the segmentation module 1200 may additionally segment the video data 2200 according to a predetermined rule. Among the timestamps associated with the key frame identified by the key frame detecting module 1100, when the interval between the two adjacent timestamps exceeds a predetermined length, the length of the retrieval video data 2230 may exceed the predetermined length. In this case, the segmentation module 1200 additionally segments the retrieval video data 2230 exceeding the predetermined length, so that the size of the unit retrieval video data 2270 may be maintained as uniformly as possible. The particular method of segmenting the video data 2200 by the segmentation module 1200 will be described in detail with reference to FIGS. 8A and 8B.

In FIG. 5, the retrieval vector generating module 1300 may generate one or more retrieval video vectors based on the retrieval video data 2230 segmented by the segmentation module 1200. The retrieval vector generating module may generate one retrieval video vector for one retrieval video data 2230, or may generate two or more retrieval video vectors for one retrieval video data 2230. In the exemplary embodiment, the generation of the retrieval video vector based on the retrieval video data 2230 may be interpreted as encoding the retrieval video data 2230 into the retrieval video vector or embedding the retrieval video data 2230 into the retrieval video vector. The retrieval video vector may have the form of a feature vector in which a semantic feature of the retrieval video data 2230 is encoded.

The retrieval vector generating module 1300 may transmit the retrieval video vector to the retrieval vector database 1400. The particular structure and operation of the retrieval vector generating module 1300 will be described below in detail with reference to FIGS. 9 and 10.

As illustrated in FIG. 5, the video retrieval service provider 1000 may store the retrieval vector in the retrieval vector database 1400. As described above, the retrieval vector database 1400 may exist in the memory of the video retrieval service provider 1000, may be transmitted to and stored in the video content service provider 2000, or may be stored in a cloud storage and the like.

Figure 6:
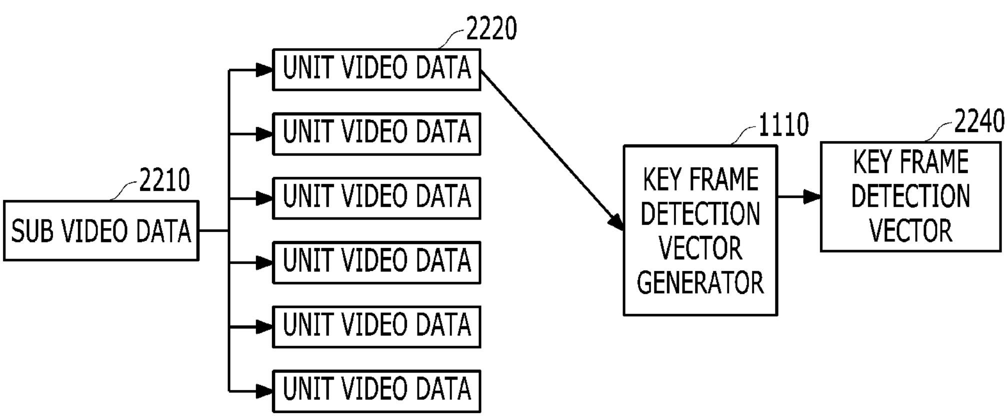
FIG. 6 is a block diagram illustrating a part of a key frame detecting module according to the exemplary embodiment of the present disclosure.

FIG. 6 is a block diagram illustrating a part of the key frame detecting module 1100 according to the exemplary embodiment of the present disclosure.

As described above, the key frame detecting module 1100 may receive the sub video data 2210 and divide the received sub video data 2210 into two or more unit video data 2220. The unit video data 2220 may be input to the key frame detection vector generator 1110. The key frame detection vector generator 1110 may generate one or more key frame detection vectors 2240 corresponding to the input unit video data 2220, respectively. The key frame detection vector 2240 may be the feature vector for determining whether the corresponding unit video data 2220 belongs to a key frame among the entire video data 2200. For example, the key frame detection vector 2240 may be the feature vector generated by encoding the feature of each of the one or more data domains included in the unit video data 2220. For example, the key frame detection vector 2240 may be the vector generated based on the feature vector generated based on visual-based data and non-visual based data (for example, voice data and text data) extracted from the unit video data 2220. The generated key frame detection vectors 2240 may be used in various manners. For example, the key frame detection vectors 2240 may be used to provide time information to divide video 2200 to the plurality of retrieval video data 2230, such that each of the segmented retrieval video data is more likely to include semantically similar data across the entire video (see FIGS. 8A and 8B). Also, key frame detection vectors 2240 may be used to extract video retrieval vector 1410 from the retrieval video data 2230 for video retrieval (see FIG. 11).

In another exemplary embodiment of the present disclosure, the key frame detection vector 2240 may include information that reflects the relative relationship with other video data existing before and after the unit video data 2220 corresponding to the corresponding vector in time. The identification of the key frame may mean to identify the frame of which the semantic change exceeds the threshold value within the temporally continuous video. In this case, in order to determine whether one unit video data 2220 is the key frame, the video data existing before and after the corresponding unit video data 2220 in time may be considered.

In order to reflect another video data corresponding to the video data before and after one unit video data 2220 in time to the key frame detection vector 2240, the key frame detection vector generator 1110 may include various network functions or algorithms that encode data by time-serially considering the data. The foregoing network function or algorithm may mean a predetermined network function and algorithm in which one data is encoded by reflecting information about other data located before and after the one data in time when the one data is encoded. The foregoing network function or algorithm may include a Recurrent Neural Network (RNN), LSTM, Seq2Seq, and the transformer (see FIG. 3).

In the exemplary embodiment of the present disclosure, the key frame detection vector 2240 may be used for identifying whether the unit video data 2220 corresponding to the corresponding key frame detection vector 2240 corresponds to the key frame. (i.e., is the key frame). In another exemplary embodiment, the key frame detection vector generator 1110 may also output a final determination result as to whether each of the unit video data 2220 corresponds to the key frame. (i.e., is the key frame) To this end, the key frame detection vector generator 1110 may further include a key frame classification module (1113) that receives the key frame detection vector 2240 for the unit video data 2220 and binary-classifies whether the unit video data 2220 corresponds to the key frame. In one embodiment of the present disclosure, the key frame classification module 1113 may be the trainable machine learning module to identify the key frame based on the key frame detection vector 2240. For example, the key frame classification module 1113 is trained to output binary decision whether the unit video data is the key frame by processing the received key frame detection vector 2240 as input via a predetermined neural network structure. In another embodiment, the key frame classification module 1113 may be the simple calculation module that calculates result values using the key frame detection vector 2240. For example, the key frame classification module 1113 may calculate the absolute value of each key frame detection vector 2240 and conduct softmax operations on the calculated value in order to get the binary decision on whether the unit video data is the key frame. The above-mentioned key frame classification module 1113 are illustrative, and the present disclosure is not limited thereto.

In the exemplary embodiment of the present disclosure, the key frame detection vector generator 1110 may process the predetermined number of unit video data 2220. When the number and the size of unit video data 2220 processible by the key frame detection vector generator 1110 are predetermined, the size of the sub video data 2210 generated from the video data 2200 may be determined according to the predetermined number and the size of unit video data 2220. For example, the key frame detection vector generator 1110 may process 128 unit video data 2220 at once, and a length of one unit video data 2220 may be set to one second. In this case, each of the sub video data 2210 may be generated so as to have a length of 128 seconds. The foregoing numerical value is simply presented for description, and the particular size and number of unit video data are not limited by the foregoing numerical values.

In the exemplary embodiment, the size and the number of unit video data 2220 processible by the key frame detection vector generator 1110 may be variable. In another exemplary embodiment, at least one of the size and the number of unit video data 2220 processible by the key frame detection vector generator 1110 may be fixed according to the structure of the network function configuring the key frame detection vector generator 1110. In another exemplary embodiment, the size and the number of unit video data 2220 processible by the key frame detection vector generator 1110 may also be changed during the processing of the video data 2200. In another exemplary embodiment, the size and the number of unit video data 2220 processible by the key frame detection vector generator 1110 may be maintained until the processing of the video data 2200 is completed.

Figure 7A:
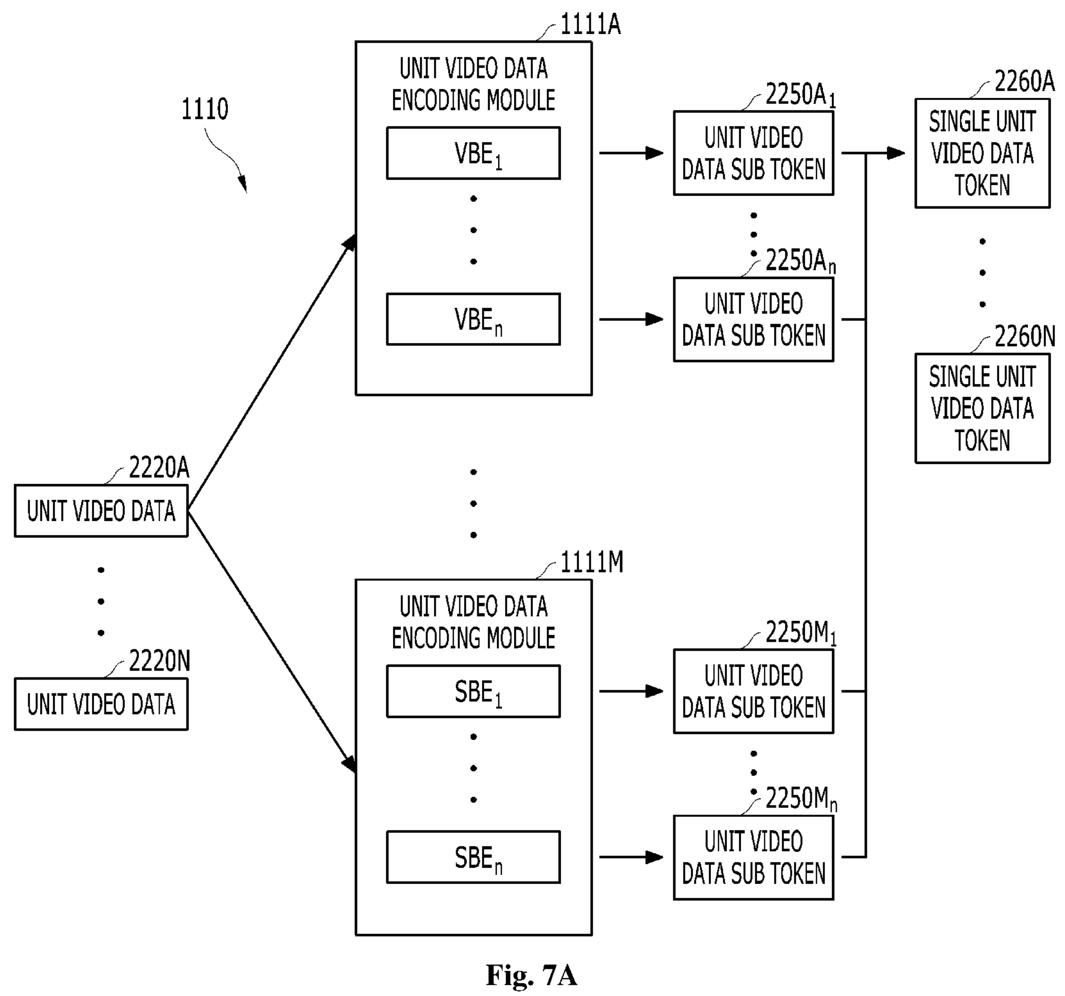
FIG. 7A is a block diagram illustrating a part of a key frame detection vector generator according to the exemplary embodiment of the present disclosure.

FIG. 7A is a block diagram illustrating a part of the key frame detection vector generator 1110 according to the exemplary embodiment of the present disclosure.

In the exemplary embodiment of the present disclosure, the key frame detection vector generator 1110 may include one or more video data encoding modules 1111A, 1111B, . . . , and 1111M. One or more video data encoding modules 1111A, 1111B, . . . , and 1111M may be encoding modules 1111A, 1111B, . . . , and 1111M which are capable of encoding the sub video data 2210 or the unit video data 2220 based on at least one of the data domains (for example, the visual image domain, the audio domain, and the text domain) included in the video data 2200 or the sub video data 2210, respectively. When one or more video data encoding modules 1111A, 1111B, . . . , and 1111M are classified by the domain of the processed data, the video data encoding modules 1111A, 1111B, . . . , and 1111M may be classified into visual-based video data encoding modules and non-visual-based video data (for example, audio, text, and metadata) encoding modules.

In the exemplary embodiment of the present disclosure, one or more video data encoding modules 1111A, 1111B, . . . , and 1111M may be encoding modules which are capable of encoding the sub video data 2210 or the unit video data 2220 based on the type of information desired to be detected among the information included in the video data 2200 or the sub video data 2210, respectively. For example, the encoding modules 1111A, 1111B, . . . , and 1111M may be the encoding modules 1111A, 1111B, . . . , and 1111M optimized for detecting a change of a subject, a change of an object of interaction, a change of an action, a change in an environment, and a shot change within the sub video data 2210 or the unit video data 2220. Since such various changes may provide information to detect key frame, each video data encoding module is trained to be able to detect at least one of such changes in the sub video data 2210 or the unit video data 2220. Exemplary video data encoding modules are described below.

In one exemplary embodiment, at least one video data encoding module 1111 may be trained to detect the shot transition. For example, the exemplary video data encoding module may include one or more trainable sub-modules to detect shot transitions (for example, hard cut or gradual transition of video). In order to train the video data encoding module 1111, the video data and the labeled information of whether the frame contains shot transitions. The video data encoding module 1111 can be trained by training data with labeled information for shot transition and become able to encode the video data to output encoding tokens containing the information of possible shot changes within the unit video data 2220.

In yet another exemplary embodiment, the video data encoding module 1111 may output the tokens containing information of the objects in the video data (for example, humans, machines, animals, or any other active objects shown in the video) In order to train the video encoding module 1111, the video data with labeled information on the objects in the video (either manually labeled by human or automatically labeled by other module, such as face recognition module well known in the art), is provided to the encoding module. The labeled data may be the information for objects shown in the video frame or the indication of whether the frame is key frame.

In yet another exemplary embodiment, the video data encoding module 1111 may output the tokens containing the information of the action change of the predominating object in the video data (for example, the action of the object in the video changes from running to jumping). In order to train the video encoding module, the video data with labeled information on actions of the object in the video is provided to the encoding module. The labeled data may be the information for actions of the object shown in the video frame or the indication of whether the frame is key frame.

In yet another exemplary embodiment, the video data encoding module may output the tokens containing the information of color/brightness change of the dominant objects or scenes. In order to train the video encoding module, the video data with labeled information on the color/brightness in the video is provided to the encoding module. The labeled data may be the information for actions of the objects shown in the video frame or the indication of whether the frame is key frame.

The type of information to be detected by the encoding modules 1111A, 1111B, . . . , and 1111M is illustrative, and the encoding modules in the exemplary embodiment of the present disclosure are not limited thereto. The type of information to be detected by the encoding modules 1111A, 1111B, . . . , and 1111M may include information disclosed in Generic Event Boundary Detection: A Benchmark for Event Segmentation, ICCV 2021, Mike Zheng Shou et al., which is incorporated herein as a reference.

The encoding modules 1111A, 1111B, . . . , and 1111M may utilize information related to one or more data domains among the information included in the sub video data 2210 or the unit video data 2220 according to the information to be detected by the encoding modules 1111A, 1111B, . . . , and 1111M. For example, the encoding module 1111A may detect information by referring to only the image data, the encoding module 1111B may detect information by referring to both the text data and the audio data, and the encoding module 1111C may detect information by referring to the text data, the audio data, and the meta data of the video data 2200. In addition to the foregoing combination, various combinations of the data domain and the encoding module 1111 may be adopted by those skilled in the art, and the encoding module 1111 in the exemplary embodiment of the present disclosure is not limited by the foregoing example. In the exemplary embodiment of the present disclosure, in the encoding modules 1111A, 1111B, . . . , and 1111M, one or more sub encoding modules may be connected in series or in parallel to configure one encoding module. For example, sub encoding modules of one group for detecting the same data domain or the same information are connected in series or in parallel to configure the video data encoding module 1111. In order to generate a single output, the corresponding encoding module 1111 may also integrate the output values of the sub encoding modules. For example, a single output may also be provided by ensembling the output values of the two or more sub encoding modules.

As illustrated in FIG. 6, the sub video data 2210 may be divided into the unit video data 2220 and transmitted to the one or more encoding modules 1111A, 1111B, . . . , and 1111M. In the exemplary embodiment, each of the encoding modules 1111A, 1111B, . . . , and 1111M may process the single unit video data at once. In another exemplary embodiment, each of the encoding modules 1111A, 1111B, . . . , and 1111M may process the unit video data having the different length or time duration. The unit video data provided to the encoding modules 1111A, 1111B, . . . , and 1111M, respectively, may include at least partially overlapping data.

The unit video encoding modules 1111A, 1111B, . . . , and 1111M may process the single unit video data and generate one or more unit video data sub tokens 2250A, 2250B, . . . , and 2250M. The number of unit video data sub tokens 2250A, 2250B, . . . , and 2250M generated by processing the single unit video data by the unit video encoding modules 1111A, 1111B, . . . , and 1111M may be the same as the number of unit video encoding modules 1111A, 1111B, . . . , and 1111M. In particular, the unit video encoding modules 1111A, 1111B, . . . , and 1111M may generate the unit video data sub tokens 2250A, 2250B, . . . , and 2250M, respectively. This is illustrative, and according to another exemplary embodiment of the present disclosure, at least a part of the unit video encoding modules 1111A, 1111B, . . . , and 1111M may generate two or more of the unit video data sub tokens 2250A, 2250B, . . . , and 2250M, or may be integrated with other unit video encoding modules and generate the unit video data sub tokens 2250A, 2250B, . . . , and 2250M, or vary the number of unit video data sub tokens 2250A, 2250B, . . . , and 2250M generated under a specific condition.

For example, the unit video encoding modules 1111A, 1111B, . . . , and 1111M may include the key frame detecting module disclosed in Chen et al, Shot Contrastive Self-Supervised Learning for Scene Boundary Detection (CVPR 2021) and Soucek and Lokoc, TransNet V2: An effective deep network architecture for fastshot transition detection, which are incorporate herein as a reference.

For one sub video data 2210, when there are N unit video data 2220 and M unit video encoding modules 1111 generate M unit video data sub tokens for the N unit video data, the key frame detection vector generator 1110 may generate M×N unit video data sub tokens 2250 for one sub video data 2210.

In the exemplary embodiment of the present disclosure, the key frame detecting module 1100 may group the unit video data sub tokens 2250 generated by the unit video encoding modules 1111A, 1111B, . . . , and 1111M before the unit video data sub tokens 2250 is input to the token encoder 1112 (see FIG. 7A). In the exemplary embodiment, the key frame detection vector generator 1110 may group the plurality of unit video data sub tokens 2250 generated based on the same unit video data 2220 among the plurality of unit video data sub tokens 2250. That is, two or more unit video data sub tokens generated from the single unit video data 2220 may be grouped for each single unit video data 2220. The key frame detection module 1100 may configure a single unit video data token 2260 for the single unit video data 2220 based on the grouped one or more unit video data sub tokens 2250. For example, the key frame detection module 1100 may configure a single unit video data token 2260 for the single unit video data 2220 by concatenating the one or more unit video data sub tokens 2250A to 2250M. In the exemplary embodiment of the present disclosure, when there are N unit video data 2220 and M unit video encoding modules 1111 generating M unit video data sub tokens for the N unit video data, the key frame detecting module 1100 may convert the M unit video data sub tokens 2250 generated by one single unit video data 2220 into one single unit video data token 2260 for each one single unit video data 2220. Therefore, the key frame detecting module 1100 may generate the N single unit video data tokens 2260 corresponding to the N unit video data 2220, respectively, and transmit the N generated single unit video data tokens 2260 to the token encoder 1112. However, this is the illustrative process, and the key frame detecting module 1100 may omit the operation of generating the single unit video data token 2260. In another exemplary embodiment, the key frame detecting module 1100 may generate the plurality of key frame detection vectors 2240 encoded by the token encoder 1112. The key frame detecting module 1100 may also group the key frame detection vectors 2240 generated based on the same single unit video data among the plurality of key frame detection vectors 2240.

Figure 7B:
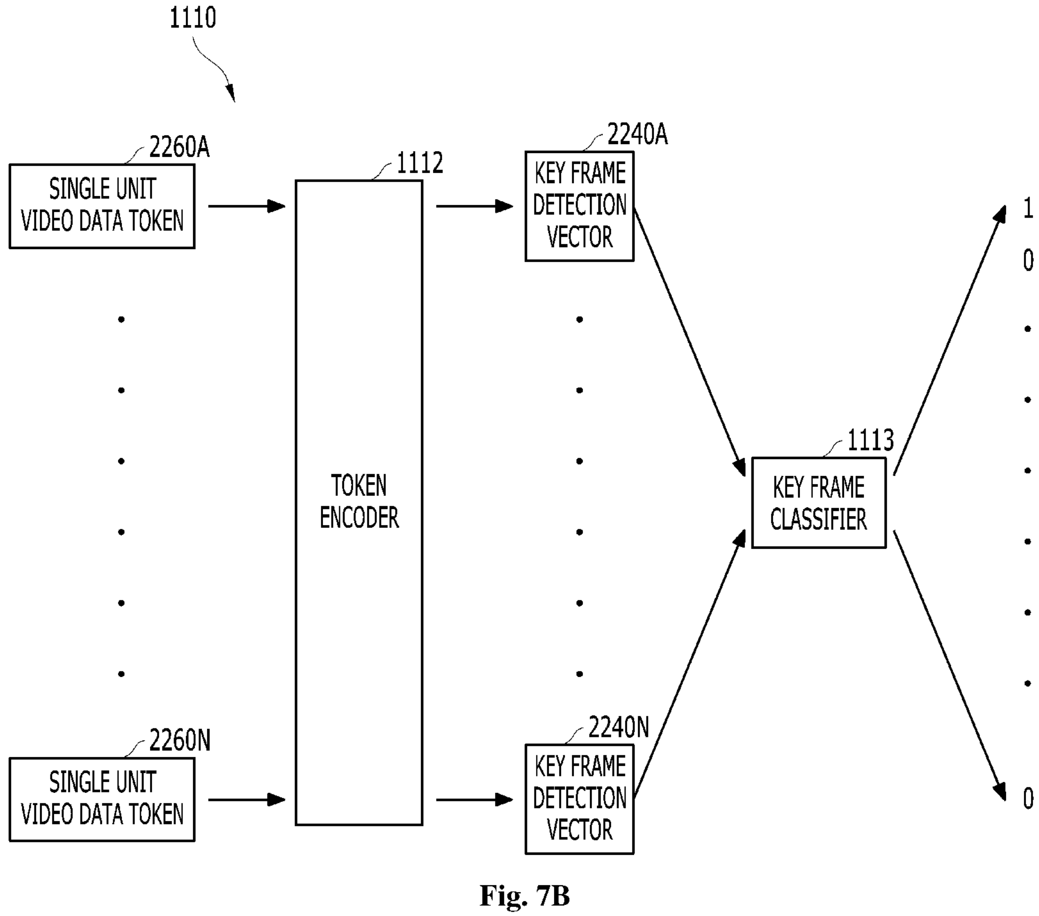
FIG. 7B is a block diagram illustrating another part of the key frame detection vector generator according to the exemplary embodiment of the present disclosure.

FIG. 7B is a block diagram illustrating another part of the key frame detection vector generator 1110 according to the exemplary embodiment of the present disclosure.

As illustrated in FIG. 7B, the key frame detecting module 1100 may include the key frame detection vector generator 1110 and the key frame detection vector generator 1110 may include the token encoder 1112.

As described above, the token encoder 1112 may include various network functions or algorithms that encode data by time-serially considering data. The foregoing network function or algorithm may mean a predetermined network function and algorithm in which one data is encoded by reflecting information about other data located before and after the one data in time when the one data is encoded. The foregoing network function or algorithm may include a Recurrent Neural Network (RNN), LSTM, Seq2Seq, and the transformer (see FIG. 3).

In some examples, token encoder 1112 may be trained based on segmented video-caption pairs for the VCMR task dataset and original video-caption pairs for the VR task dataset. Here, segments of a video included in the training data may be segmented based on their ground truth (GT) start and end time steps for each query (caption) annotation.

In the exemplary embodiment of the present disclosure, the token encoder 1112 may include a transformer structure. In this exemplary embodiment, the token encoder 1112 may receive the unit video data sub tokens 2250 or the single unit video data token 2260 and generate a plurality of key frame detection vectors 2240 by encoding the received unit video data sub tokens 2250 or single unit video data token 2260.

As described above, the token encoder 1112 may receive the single unit video data token 2260 corresponding to each unit video data 2220 by pre-processing the unit video data sub tokens 2250, and generate the plurality of key frame detection vectors 2240 corresponding to the unit video data 2220, respectively.

In another exemplary embodiment of the present disclosure, the token encoder 1112 may generate the plurality of key frame detection vectors 2240 by encoding the unit video data sub tokens 2250. As described above, the number of plurality of key frame detection vectors 2240 generated by the token encoder 1112 may be larger than the number of unit video data 2220 included in one sub video data 2100. The key frame detecting module 1100 may group and process the key frame detection vectors 2240 processed by the same unit video data 2220 by post-processing the output of the token encoder 1112.

In another exemplary embodiment of the present disclosure, the token encoder 1112 may generate one key frame detection vector 2270 for each single unit video data 2220, or generate two or more key frame detection vectors 2240 for the single unit video data 2220.

As illustrated in FIG. 7B, the key frame detection vector generator 1110 may further include a key frame classifier 1113. Otherwise, the key frame classifier 1113 may be connected to the outside of the key frame detection vector generator 1110 to configure the key frame detecting module 1100.

The key frame classifier 1113 may determine whether the corresponding unit video data 2220 corresponds to the key frame by processing the key frame detection vector 2240 corresponding to the unit video data 2220.

Figures 8A, 8B:
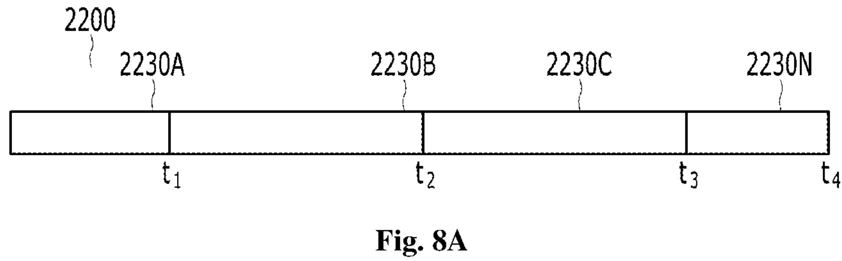
FIGS. 8A and 8B are conceptual diagrams illustrating an operation of segmenting, by a segmentation module, video data according to the exemplary embodiment of the present disclosure.

FIGS. 8A and 8B are conceptual diagrams illustrating an operation of segmenting, by the segmentation module 1200, video data according to the exemplary embodiment of the present disclosure.

The key frame detecting module 1100 may transmit the time information of the key frame identified by the key frame classifier 1113 to the segmentation module 1200. As illustrated in the example of FIG. 8A, the segmentation module 1200 may receive three time information (for example, times stamps of t1, t2, and t3) corresponding to three key frames identified by the key frame detecting module 1100. The segmentation module 1200 may generate a plurality of retrieval video data 2230 with the plurality of time stamps as a start time or an end time based on the plurality of received timestamps. In the exemplary embodiment of FIG. 8A, the segmentation module 1200 may segment the retrieval video data so that the retrieval video data 2230A has a time duration of 0 to t1 s, the retrieval video data 2230B has a time duration of t1 to t2 s, the retrieval video data 2230C has a time duration of t2 to t3 s and the retrieval video data 2230N has a time duration of t3 to t4 s.

As illustrated in FIG. 8B, when the time interval between the predetermined two adjacent timestamps among the timestamps received from the key frame detecting module 1100 exceeds a predetermined time, the segmentation module 1200 may generate retrieval video data 2231A, 2231B, 2231C, . . . , and 2231N by additionally segmenting the video data 2200 during the corresponding time interval according to a predetermined rule.

The predetermined rule of additionally segmenting the video data 2200 by the segmentation module 1200 may mean, for example, the rule of segmenting the video having a predetermined length over a predetermined time interval. In this case, some of the plurality of video segmented by the segmentation module 1200 according to the rule may have an overlapping section.

Figure 9:
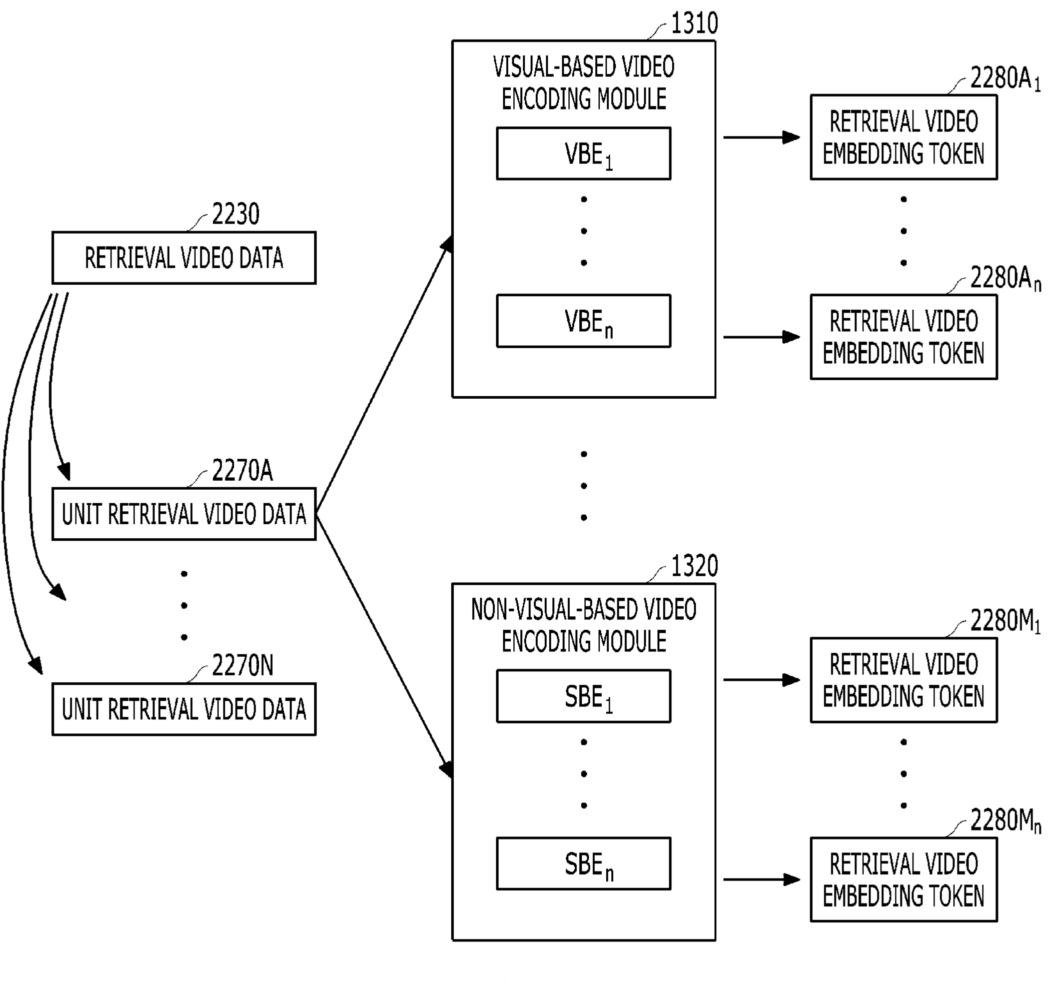
FIG. 9 is a block diagram illustrating a part of a retrieval vector generating module according to the exemplary embodiment of the present disclosure.

FIG. 9 is a block diagram illustrating a part of the retrieval vector generating module 1300 according to the exemplary embodiment of the present disclosure.

As illustrated in FIG. 5, the segmentation module 1200 may provide the segmented video to the retrieval vector generating module 1300. As illustrated in FIG. 9, the one or more segmented retrieval video data 2230 may be encoded by M video encoding modules, for example, the visual-based video encoding module 1310 or the non-visual-based video encoding module 1320, respectively.

In another exemplary embodiment of the present disclosure, the retrieval vector generating module 1300 may include different encoding modules for multimodal information to be extracted from the retrieval video data 2230. For example, the retrieval vector generating module 1300 may include a video recognizing module, an Optical Character Recognition (OCR) encoding module, an object detecting module, an action recognition module, a place recognition module, and an image recognition module.

As an example, the visual-based video encoding module 1310 may mean the module for encoding video data based on various information based on a visual signal among the data included in the video data. For example, examples of the visual signal included in the video data may include an RGB image, information associated with an object included in an image (a class of an object, a location at which an object is present within a frame, and a relative location of two or more objects within a frame), information associated with an action, a location, and/or a place, and text information visually displayed in the frame included in the video data (text information may be identified by the OCR), but the visual signal is not limited thereto.

As another example, the non-visual-based video encoding module 1320 may mean the module for encoding the video data based on various information based on a signal, not a visual signal, among the data included in the video data. For example, examples of the non-visual signal included in the video information may include voice data, non-voice sound data, text data (all of the text data that are not visually expressed within the frame), and meta data of the retrieval video data 2230.

In some examples, the visual-based video encoding module 1310 and the non-visual-based video encoding module 1320 may be trained based on training data that includes a plurality of video-caption pairs. For example, a caption for each video may be extracted from a video or audio script, automatically-extracted speech transcriptions from the video, or directly annotated by an expert.

Similar to the description with reference to FIG. 7A, one or more retrieval video data 2230 may be also divided to the plurality of unit retrieval video data 2270A, 2270B, . . . , and 2270N and each unit retrieval video data may be sequentially encoded by the video encoding modules 1310 and 1320. That is, for one retrieval video data 2230 divided into N unit retrieval video data 2270 and M unit video encoding modules 1310 and 1320 generating M retrieval video embedding tokens for each of the N unit retrieval video data, the vector generating module 1300 may generate M×N retrieval video embedding tokens 2280 for one retrieval video data 2230.

An example of the method of encoding, by the retrieval vector generating module 1300, the unit retrieval video data is disclosed in "Multi-modal Transformer for Video Retrieval" (https://arxiv.org/pdf/2007.10639.pdf)", which is incorporated herein as a reference.

Figure 10:
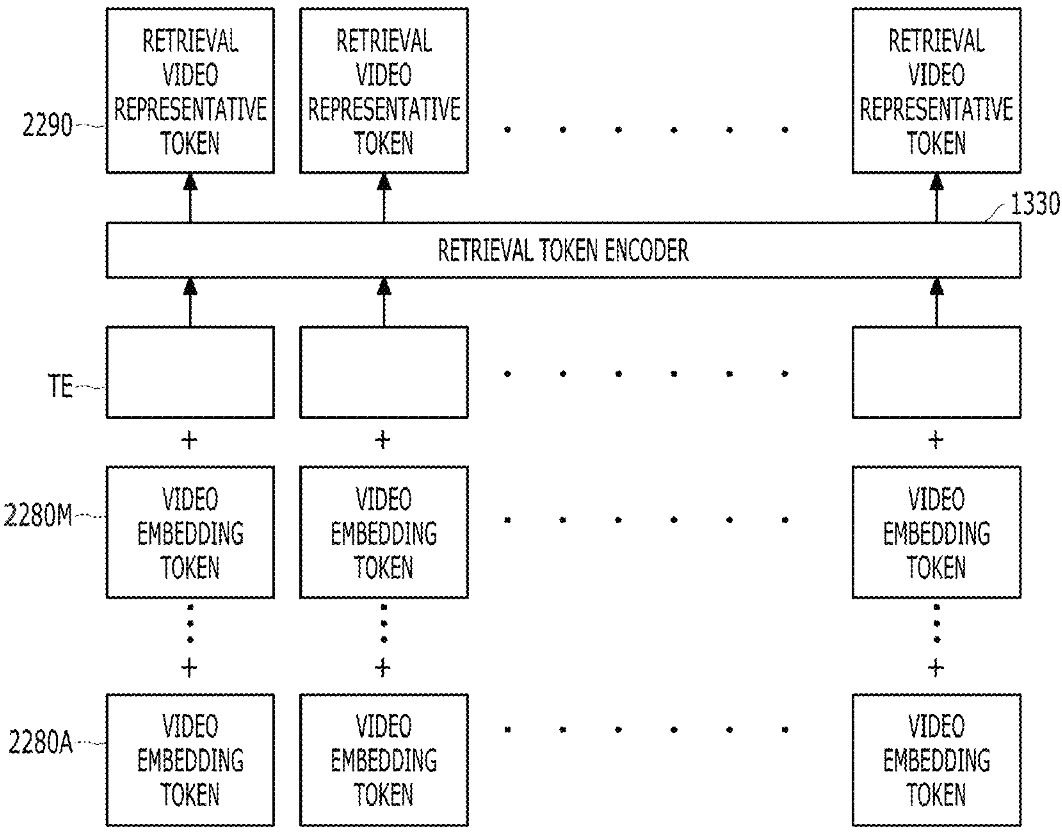
FIG. 10 is a block diagram illustrating another part of the retrieval vector generating module according to the exemplary embodiment of the present disclosure.

FIG. 10 is a block diagram illustrating another part of the retrieval vector generating module 1300 according to the exemplary embodiment of the present disclosure.

In the exemplary embodiment of the present disclosure, the retrieval vector generating module 1300 may include a retrieval token encoder 1330. The retrieval token encoder 1330 may include various network functions or algorithms for encoding data by time-serially considering data, similar to the token encoder 1113. The foregoing network function or algorithm may mean a predetermined network function and algorithm in which one data is encoded by reflecting information about other data located before and after the one data in time when the one data is encoded. The foregoing network function or algorithm may include a Recurrent Neural Network (RNN), LSTM, Seq2Seq, and the transformer (see FIG. 3).

In some examples, retrieval token encoder 1330 may be trained based on segmented video-caption pairs for the VCMR task dataset and original video-caption pairs for the VR task dataset. Here, segments of a video included in the training data may be segmented based on their ground true (GT) start and end time steps for each query (caption) annotation.

In the exemplary embodiment of the present disclosure, the retrieval token encoder 1330 may include a transformer structure. In this exemplary embodiment, the retrieval token encoder 1330 may generate a retrieval video representative token 2290 by using retrieval video embedding tokens 2280A, . . . , and 2280M generated by the video encoding modules 1310, 1320, and the like, respectively, as inputs. In the computation process of the retrieval token encoder 1330, the retrieval token encoder 1330 may perform temporal encoding. In order to perform the temporal encoding, the retrieval token encoder 1330 may process frame-related information (for example, a number of the corresponding frame or a time frame) of the unit retrieval video data 2270 corresponding to one or more retrieval video embedding tokens 2280 together with the retrieval video embedding tokens 2280. 'TE (Time Embedding)' blocks shown in FIG. 10 indicate blocks added to perform the above-described temporal encoding.

In another exemplary embodiment, for the video embedding tokens 2280A, . . . , and 2280M, the retrieval token encoder 1330 may encode the corresponding embedding tokens 2280A, . . . , and 2280M in parallel and group the tokens 2290 generated based on the same unit retrieval video data 2270 among the encoded retrieval video representative tokens 2290. That is, the video embedding tokens 2280A, . . . , and 2280M input to the retrieval token encoder 1330 may be calculated by the retrieval token encoder 1330 without a calculation between the tokens. In this exemplary embodiment, the retrieval token encoder 1330 may perform a calculation on the concatenated embedding tokens 2280A, . . . , and 2280M.

The retrieval vector generating module 1300 may generate the video retrieval vector 1410 for the retrieval video data 2230 based on one or more retrieval video representative tokens 2290 generated for the single retrieval video data 2230. Various method of integrating the plurality of feature vectors into one may be performed by using one or more retrieval video representative tokens 2290. For example, for one or more retrieval video representative tokens 2290, pooling operations, such as Max Pooling, Mean Pooling, and Global Average Pooling, may be performed.

The video retrieval vectors 1410 generated in the retrieval vector generating module 1300 may be stored in the retrieval vector database 1400 as described above.

Figure 11:
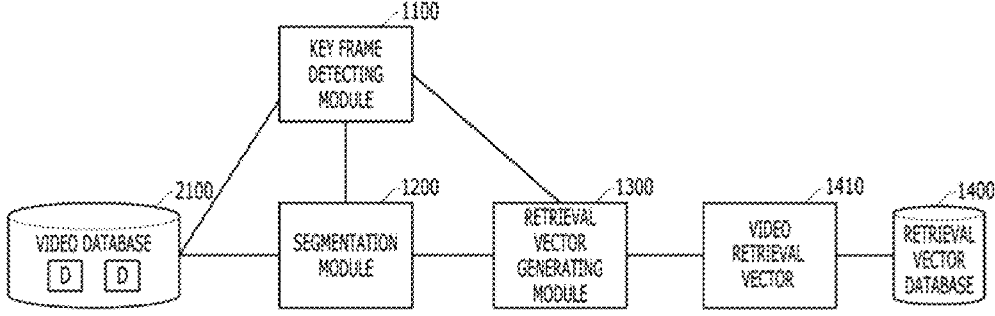
FIG. 11 is a block diagram illustrating a part of the video retrieval service provider according to another exemplary embodiment of the present disclosure.

FIG. 11 is a block diagram illustrating a part of the video retrieval service provider 1000 according to another exemplary embodiment of the present disclosure.

In the exemplary embodiment of the present disclosure, as described above, the key frame detecting module 1100 may segment one or more video data into two or more unit video data. The key frame detecting module 1100 may encode, by one or more encoders comprised in the key frame detection module, two or more unit video data. The key frame detecting module 1100 may generate one or more unit video data tokens 2250 for each of the two or more unit video data based on the result of the encoding. The key frame detecting module 1100 may identify key frame information among the two or more unit video data 2220 based on feature values of the two or more unit video data tokens 2250.

More specifically, the key frame detecting module 1100 may generate one or more key frame detection vectors 2240 for the unit video data 2220 based on the one or more unit video data tokens 2250. The key frame detection vectors 2240 may be used for identifying whether the unit video data corresponding to the corresponding key frame detection vector corresponds to the key frame.

In the exemplary embodiment of the present disclosure, as described above, the segmentation module 1200 may segment one or more video data 2200 into the retrieval video data 2230 based on the key frame information received from the key frame detecting module 1100. In other words, the segmentation module 1200 may generate the one or more retrieval video data 2230 by grouping the two or more unit video data 2220 based on the identified key frame information. In this case, each of the one or more retrieval video data 2230 may comprise unit video data 2220 grouped based on the values of the unit video data tokens 2250. Also, the each of the one or more retrieval video data 2230 comprises two or more temporally continuous unit video data 2220. The each of the one or more retrieval video data 2230 may comprise at least one unit video data 2220 identified as key frame, and the unit video data 2220 identified as key frame is temporally the most preceding or temporally the most trailing among the two or more temporally continuous unit video data 2220.

In the exemplary embodiment of the present disclosure, the key frame detecting module 1100 of the video retrieval service provider 1000 may transmit the plurality of key frame detection vectors 2240 generated for the unit video data 2220 in the key frame detecting module 1100 to the retrieval vector generating module 1300.

The retrieval vector generating module 1300 may receive duration information of the retrieval video data 2230 from the segmentation module 1200. The retrieval vector generating module 1300 may group the key frame detection vectors 2240 received from the key frame detecting module 1100 based on the duration information of the retrieval video data 2230 received from the segmentation module 1200. For example, the retrieval vector generating module 1300 may group the key frame detection vectors 2240 generated based on the unit video data 2220 included in the single retrieval video data 2230.

In the exemplary embodiment of the present disclosure, the retrieval vector generating module 1300 may generate feature vector of one or more retrieval video data 2230 based on a combination of one or more vectors among the key frame detection vectors 2240.

For example, the retrieval vector generating module 1300 may generate the video retrieval vector 1410 for the retrieval video data 2230 based on the grouped key frame detection vectors 2240. Based on the plurality of grouped key frame detection vectors 2240, in order to generate the video retrieval vector 1410, various methods of integrating the plurality of feature vectors into one may be performed. For example, for one or more key frame detection vectors 2240, pooling operations, such as Max Pooling, Mean Pooling, and Global Average Pooling, may be performed.

Through the foregoing method, the retrieval vector generating module 1300 does not implement the separate retrieval token encoder 1330, but utilize the key frame detection vectors 2240 generated in the key frame detecting module 1100, thereby greatly saving computing resources consumed for generating the video retrieval vector 1410.

Specifically, in the conventional video retrieval method, a vector for detecting a key frame and a vector for video retrieval are extracted, respectively. In the exemplary embodiment of the present disclosure, as described above, the video retrieval vector 1410 for the retrieval video data 2230 may be generated by re-utilizing key frame detection vectors 2240 used to identify key frame information. Therefore, by reducing overlapping processes (e.g., encoding process, transformer process) while extracting both a vector for detecting a key frame and a vector for retrieving a video, computing resources required to generate the video retrieval vector 1410 can be greatly saved.

Figure 12:
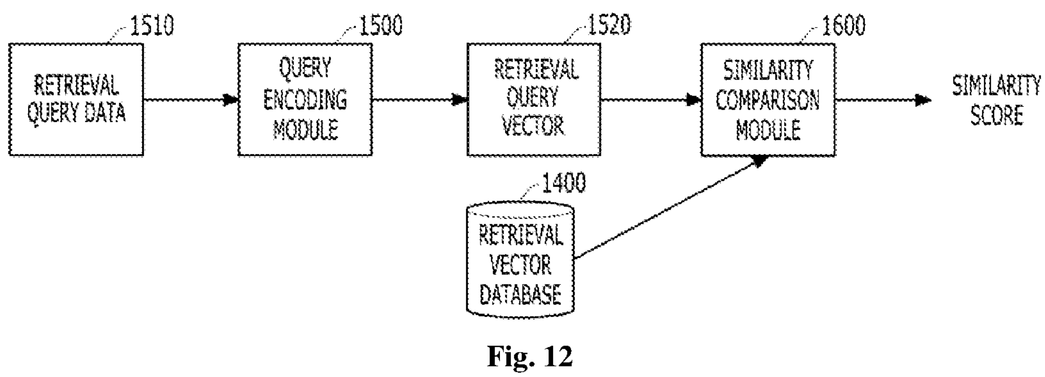
FIG. 12 is a block diagram illustrating another part of the video retrieval service provider 1000 according to the exemplary embodiment of the present disclosure.

FIG. 12 is a block diagram illustrating another part of the video retrieval service provider 1000 according to the exemplary embodiment of the present disclosure.

The video retrieval service provider 1000 may receive retrieval query data 1510 for performing the video retrieval after databaseization for the video retrieval vector 1410 is in progress. The retrieval query data 1510 may include all of the form of various data domains configuring the video data 2100. For example, the retrieval query data may include video data having a predetermined length, text strings, audio voice waveform, and/or video meta data including a title and a description of the video, but the retrieval query data does not limit thereto.

When the retrieval query data is received, the query encoding module 1500 may encode the received retrieval query data 1510 into a retrieval query vector 1520. In order to encode the retrieval query data 1510, the query encoding module 1500 may have the structure partially similar to that of the key frame detecting module 1100 or the retrieval vector generating module 1300, or may generate the retrieval query vector 1520 by utilizing at least a part of the modules 1100 and 1300. Also, the query encoding module 1500 may be trained in a similar manner to the key frame detecting module 1100 or the retrieval vector generating module 1300.

The generated retrieval query vector 1520 may have a form computable with the video retrieval vector 1410. For example, at least a part of each of the retrieval query vector 1520 and the video retrieval vector 1410 may include components in a computable form, that are compatible with each other. In particular, the retrieval query vector 1520 and the video retrieval vector 1410 may have the same dimension. In another exemplary embodiment, the retrieval query vector 1520 and the video retrieval vector 1410 may be the vectors having at least partially identical elements. In another exemplary embodiment, all elements of the retrieval query vector 1520 may exist in the video retrieval vector 1410 or the reverse case may be achieved.

The similarity comparing module 1600 may compare similarity between the retrieval query vector 1520 and the video retrieval vector 1410. In order to compare the similarity between the two vectors, various similarity comparing methods may be performed as described above. The similarity comparing module 1600 may compare the entirety or a part of the video retrieval vector 1410 included in the retrieval vector database 1400 with the retrieval query vector 1520.

The similarity comparing module 1600 may exclude the video retrieval vectors 1410 expected to have low similarity with the video retrieval vector 1410 among the video retrieval vector 1410 from comparison targets by relying on the publicly known pre-processing method.

The similarity comparing module 1600 identify a similarity score of the video retrieval vector 1410 having the highest similarity with the retrieval query vector 1520 among the video retrieval vector 1410. The similarity comparing module 1600 may select one or more video retrieval vectors 1410 corresponding to the retrieval query vector 1520 by a predetermined method. For example, the similarity comparing module 1600 may select one video retrieval vector 1410 having the highest similarity score with the retrieval query vector 1520 as a retrieval result.

In the exemplary embodiment, when the similarity comparing module 1600 selects the two or more video retrieval vectors 1410, the similarity comparing module 1600 may select the video retrieval vectors 1410 corresponding to the target retrieval video adjacent to one video retrieval vector 1410 having the highest similarity score with the query vector 1510 as a retrieval result.

In another exemplary embodiment, the similarity comparing module 1600 may select N higher video retrieval vectors 1410 having high similarity, and select the video retrieval vector 1410 corresponding to the target retrieval video adjacent to the N video retrieval vectors 1410 as a retrieval result.

In another exemplary embodiment, the similarity comparing module 1600 may select N higher video retrieval vectors 1410 having high similarity, and confirm similarity scores of the video retrieval vectors 1410 corresponding to the target retrieval video adjacent to the N video retrieval vectors 1410. In the exemplary embodiment, the similarity comparing module 1600 may select the corresponding video retrieval vector 1410 as a retrieval result only when the similarity score of the video retrieval vector 1410 corresponding to the adjacent target retrieval video is equal to or larger than a threshold value. The corresponding threshold value may be determined based on the similarity score of the video retrieval vector 1410 recorded to have the highest similarity score. For example, corresponding threshold value may be determined as a value obtained by multiplying the similarity score of the video retrieval vector 1410 recorded to have the highest similarity score by 0.9. However, this is illustrative, and the method of setting the threshold value is not limited thereto.

In another exemplary embodiment, the similarity score of the video retrieval vectors 1410 corresponding to the target retrieval video adjacent to one video retrieval vector 1410 having the highest similarity score with the query vector 1510 may be confirmed. In the exemplary embodiment, the similarity comparing module 1600 may select the corresponding video retrieval vector 1410 as a retrieval result only when the similarity score of the video retrieval vector 1410 corresponding to the adjacent target retrieval video is equal to or larger than a threshold value.

The video retrieval service provider 1000 may select one or more target retrieval video by the result of the comparison between the retrieval query vector and video retrieval vector. The video retrieval service provider 1000 may identify start and end time information of the selected target retrieval video data.

Figure 13:
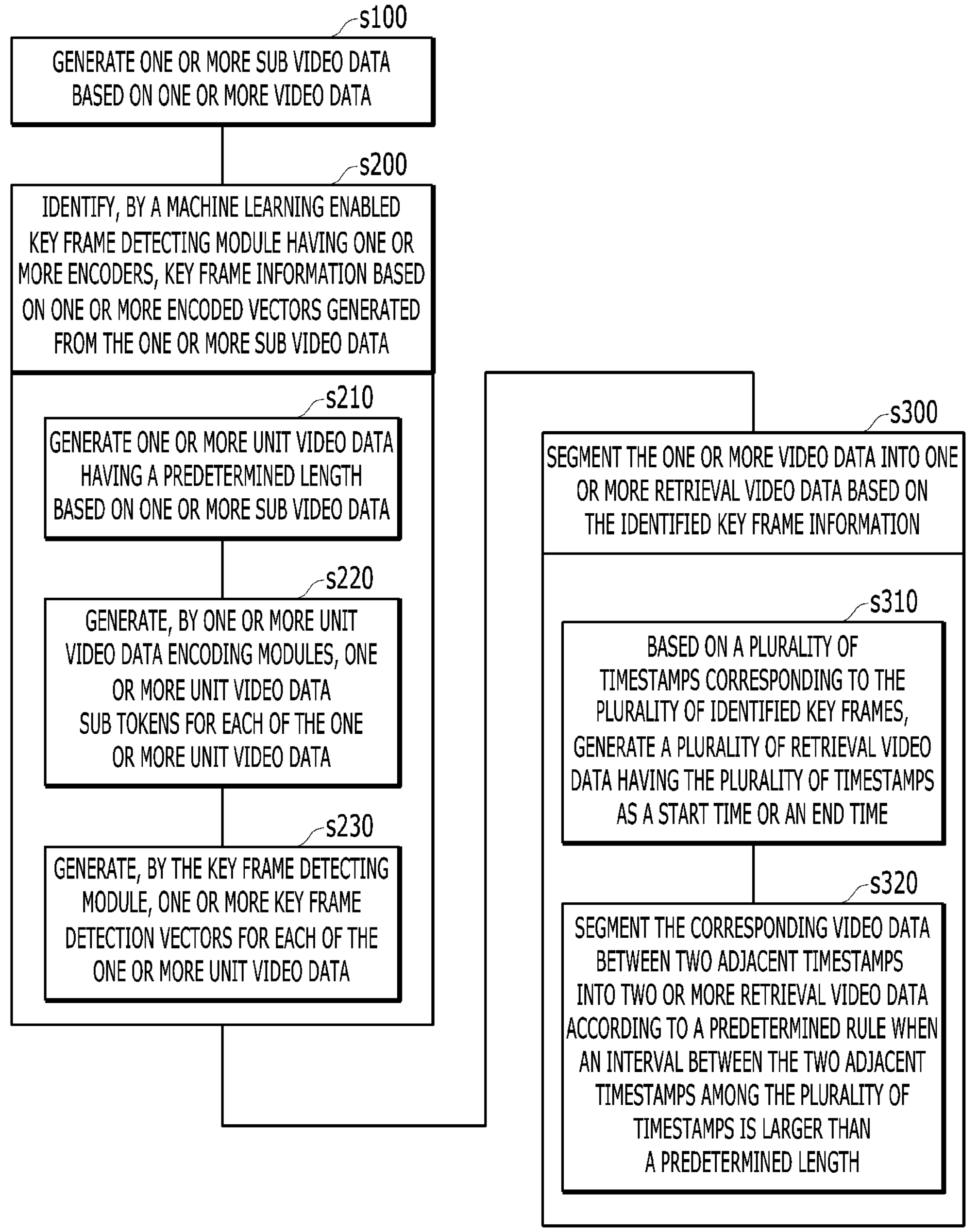
FIG. 13 is an exemplary flowchart illustrating a video retrieval method according to an exemplary embodiment of the present disclosure.

FIG. 13 is an exemplary flowchart illustrating a video retrieval method according to an exemplary embodiment of the present disclosure.

In the exemplary embodiment of the present disclosure, the video retrieval method may include an operation S100 of generating one or more sub video data based on one or more video data.

In the exemplary embodiment of the present disclosure, the video retrieval method may include an operation S200 of identifying, by a machine learning enabled key frame detecting module having one or more encoders, key frame information based on one or more encoded vectors generated from the one or more sub video data.

In the exemplary embodiment of the present disclosure, the operation S200 of identifying of key frame information may include an operation S210 of generating one or more unit video data having a predetermined length based on one or more sub video data.

In the exemplary embodiment of the present disclosure, the operation S200 of identifying of key frame information may include an operation S220 of generating, by one or more unit video data encoding modules, one or more unit video data sub tokens for each of the one or more unit video data.

In the exemplary embodiment of the present disclosure, the operation S200 of identifying of key frame information may include an operation S230 of generating, by the key frame detecting module, one or more key frame detection vectors for each of the one or more unit video data.

In the exemplary embodiment of the present disclosure, the video retrieval method may include an operation S300 of segmenting one or more video data into one or more retrieval video data based on the identified key frame information.

In the exemplary embodiment of the present disclosure, the operation S300 of the segmenting of the one or more video data may include an operation S310 of, based on a plurality of timestamps corresponding to the plurality of identified key frames, generating a plurality of retrieval video data having the plurality of timestamps as a start time or an end time.

In the exemplary embodiment of the present disclosure, the operation S300 of the segmenting of the one or more video data may include an operation S320 of segmenting the corresponding video data between two adjacent timestamps into two or more retrieval video data according to a predetermined rule when an interval between the two adjacent timestamps among the plurality of timestamps is larger than a predetermined length.

The foregoing operations of the video retrieval method are simply present for description, and some operations may be omitted or a separate operation may be added. Further, the operations of the foregoing video retrieval method may be performed according to a predetermined order. Alternative operations will be further described below.

FIG. 14 is an exemplary flowchart illustrating the operation S220 of the generating of the unit video data token according to an exemplary embodiment of the present disclosure.

In the exemplary embodiment of the present disclosure, the operation S220 of the generating of the unit video data encoding token may include an operation S221 of generating, by two or more unit video data encoding modules, two or more unit video data sub tokens for a single unit video data.

The foregoing operations of the video retrieval method are simply present for description, and some operations may be omitted or a separate operation may be added. Further, the operations of the foregoing video retrieval method may be performed according to a predetermined order.

FIG. 15 is an exemplary flowchart illustrating the operation S230 of the generating of the key frame detection vectors according to an exemplary embodiment of the present disclosure.

In the exemplary embodiment of the present disclosure, the operation S230 of the generating of the key frame detection vectors may include an operation S231 of generating, by the key frame detecting module, one or more key frame detection vectors for the unit video data based on the one or more unit video data sub tokens.

In the exemplary embodiment of the present disclosure, the operation S230 of the generating of the key frame detection vectors may include an operation S232 of generating, by the key frame detecting module, the one or more key frame detection vectors for the single unit video data based on the unit video data sub tokens generated for the single unit video data.

In the exemplary embodiment of the present disclosure, the operation S230 of the generating of the key frame detection vectors may include an operation S233 of generating a unit video data token based on the two or more unit video data sub tokens generated for the single unit video data.

In the exemplary embodiment of the present disclosure, the operation S230 of the generating of the key frame detection vectors may include an operation S234 of generating, by the key frame detecting module, one or more key frame detection vectors for the single unit video data based on the generated unit video data token.

In the exemplary embodiment of the present disclosure, the operation S230 of the generating of the key frame detection vectors may include an operation S235 of generating, by the key frame detecting module, a plurality of unit video data tokens based on a plurality of unit video data sub tokens generated for two or more unit video data.

In the exemplary embodiment of the present disclosure, the operation S230 of the generating of the key frame detection vectors may include an operation S236 of generating one or more key frame detection vector for each unit video data based on each of the unit video data tokens generated for the same unit video data among the plurality of unit video data tokens.

The foregoing operations of the video retrieval method are simply present for description, and some operations may be omitted or a separate operation may be added. Further, the operations of the foregoing video retrieval method may be performed according to a predetermined order. Alternative operations will be further described below.

Figure 16:
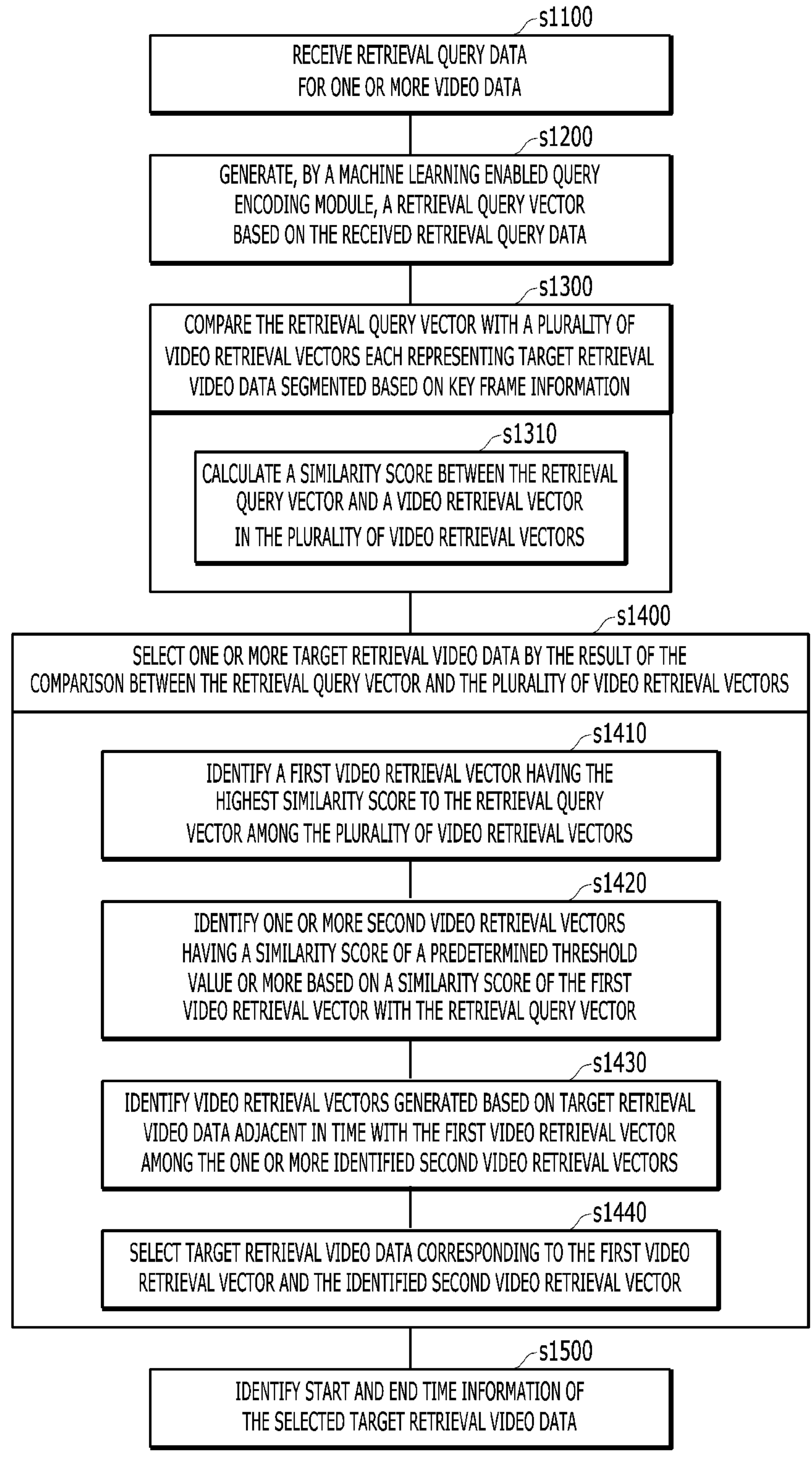
FIG. 16 is another exemplary flowchart illustrating a video retrieval method according to an exemplary embodiment of the present disclosure.

FIG. 16 is another exemplary flowchart illustrating a video retrieval method according to an exemplary embodiment of the present disclosure.

In the exemplary embodiment of the present disclosure, the video retrieval method may include an operation S1100 of receiving retrieval query data for one or more video data.

In the exemplary embodiment of the present disclosure, the video retrieval method may include an operation S1200 of generating, by a machine learning enabled query encoding module, a retrieval query vector based on the received retrieval query data.

In the exemplary embodiment of the present disclosure, the video retrieval method may include an operation S1300 of comparing the retrieval query vector with a plurality of video retrieval vectors each representing target retrieval video data segmented based on key frame information.

In the exemplary embodiment of the present disclosure, the operation S1300 of the comparing includes an operation S1310 of calculating a similarity score between the retrieval query vector and a video retrieval vector in the plurality of video retrieval vectors.

In the exemplary embodiment of the present disclosure, the video retrieval method may include an operation S1400 of selecting one or more target retrieval video data by the result of the comparison between the retrieval query vector and a video retrieval vector in the plurality of video retrieval vectors.

In the exemplary embodiment of the present disclosure, the operation S400 of the selecting includes an operation S1410 of identifying a first video retrieval vector having the highest similarity score to the retrieval query vector among the plurality of video retrieval vectors.

In the exemplary embodiment of the present disclosure, the operation S400 of the selecting includes an operation S1420 of identifying one or more second video retrieval vectors having a similarity score of a predetermined threshold value or more based on a similarity score of the first video retrieval vector with the retrieval query vector.

In the exemplary embodiment of the present disclosure, the operation S400 of the selecting includes an operation S1430 of identifying video retrieval vectors generated based on target retrieval video data adjacent in time with the first video retrieval vector among the one or more identified second video retrieval vectors.

In the exemplary embodiment of the present disclosure, the operation S400 of the selecting includes an operation S1440 of selecting target retrieval video data corresponding to the first video retrieval vector and the identified second video retrieval vector.

In the exemplary embodiment of the present disclosure, the video retrieval method may the operation S1500 of identifying start and end time information of the selected target retrieval video data.

The foregoing operations of the video retrieval method are simply present for description, and some operations may be omitted or a separate operation may be added. Further, the operations of the foregoing video retrieval method may be performed according to a predetermined order.

Figure 17:
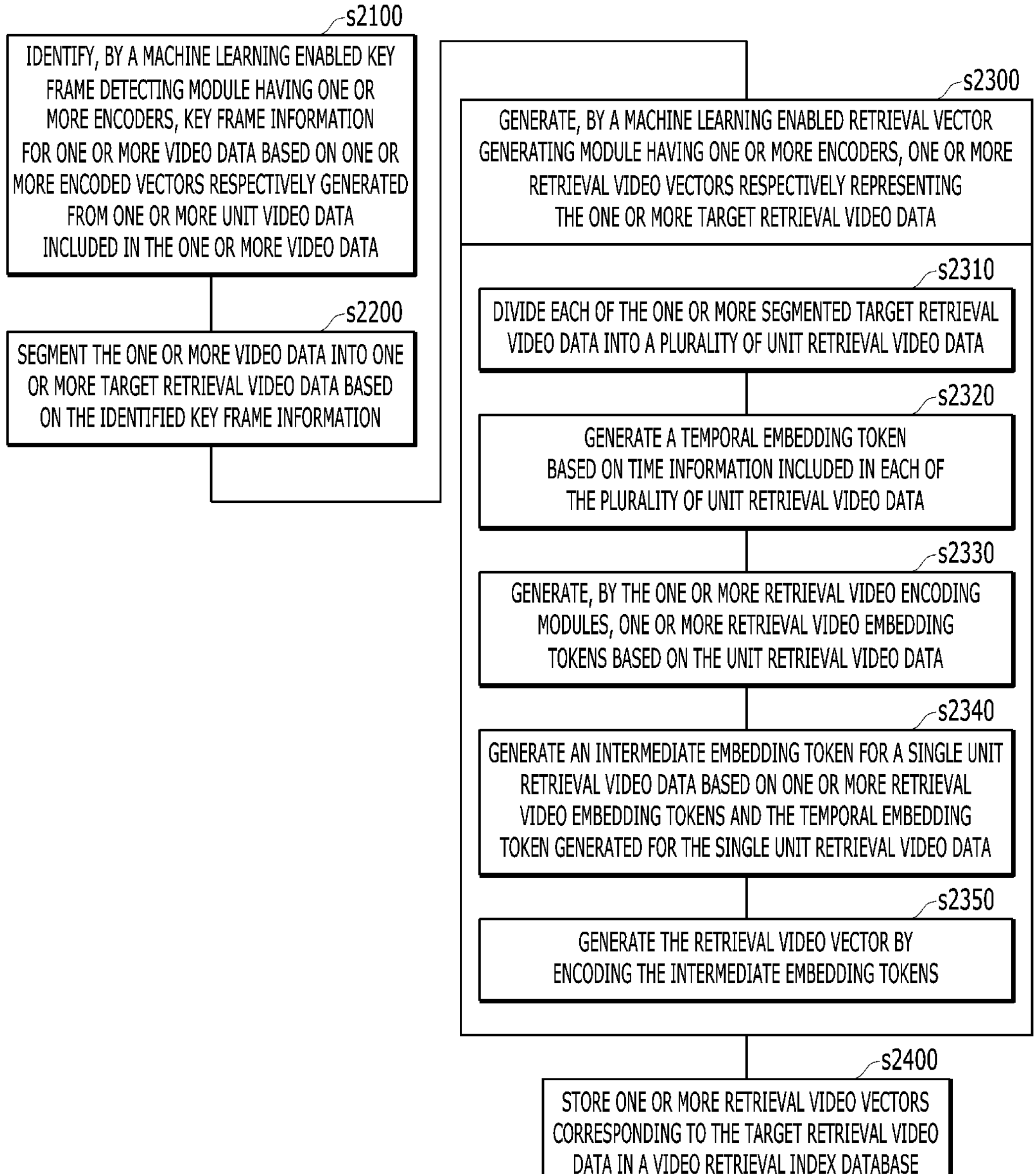
FIG. 17 is yet another exemplary flowchart illustrating a video retrieval method according to an exemplary embodiment of the present disclosure.

FIG. 17 is yet another exemplary flowchart illustrating a video retrieval method according to an exemplary embodiment of the present disclosure.

In the exemplary embodiment of the present disclosure, the video retrieval method may include an operation S2100 of identifying, by a machine learning enabled key frame detecting module having one or more encoders, key frame information for one or more video data based on one or more encoded vectors respectively generated from one or more unit video data included in the one or more video data.

In the exemplary embodiment of the present disclosure, the video retrieval method may include an operation S2200 of segmenting the one or more video data into one or more target retrieval video data based on the identified key frame information.

In the exemplary embodiment of the present disclosure, the video retrieval method may include an operation S2300 of generating, by a machine learning enabled retrieval vector generating module having one or more encoders, one or more retrieval video vectors respectively representing the one or more target retrieval video data.

In the exemplary embodiment of the present disclosure, the operation S2300 of the generating of the one or more retrieval video vectors may further include an operation S2310 of dividing each of the one or more segmented retrieval video data into a plurality of unit retrieval video data. In the exemplary embodiment of the present disclosure, the operation S2300 of the generating of the one or more retrieval video vectors may further include an operation S2320 of generating a temporal embedding token based on time information included in each of the plurality of unit retrieval video data.

In the exemplary embodiment of the present disclosure, the operation S2300 of the generating of the one or more retrieval video vectors may include an operation S2330 of generating, by one or more retrieval video encoding modules, one or more retrieval video embedding tokens based on the unit retrieval video data.

In the exemplary embodiment of the present disclosure, the video retrieval method may include an operation S2400 of storing one or more retrieval video vectors corresponding to the target retrieval video data in a video retrieval index database The foregoing operations of the video retrieval method are simply present for description, and some operations may be omitted or a separate operation may be added. Further, the operations of the foregoing video retrieval method may be performed according to a predetermined order.

Figure 18:
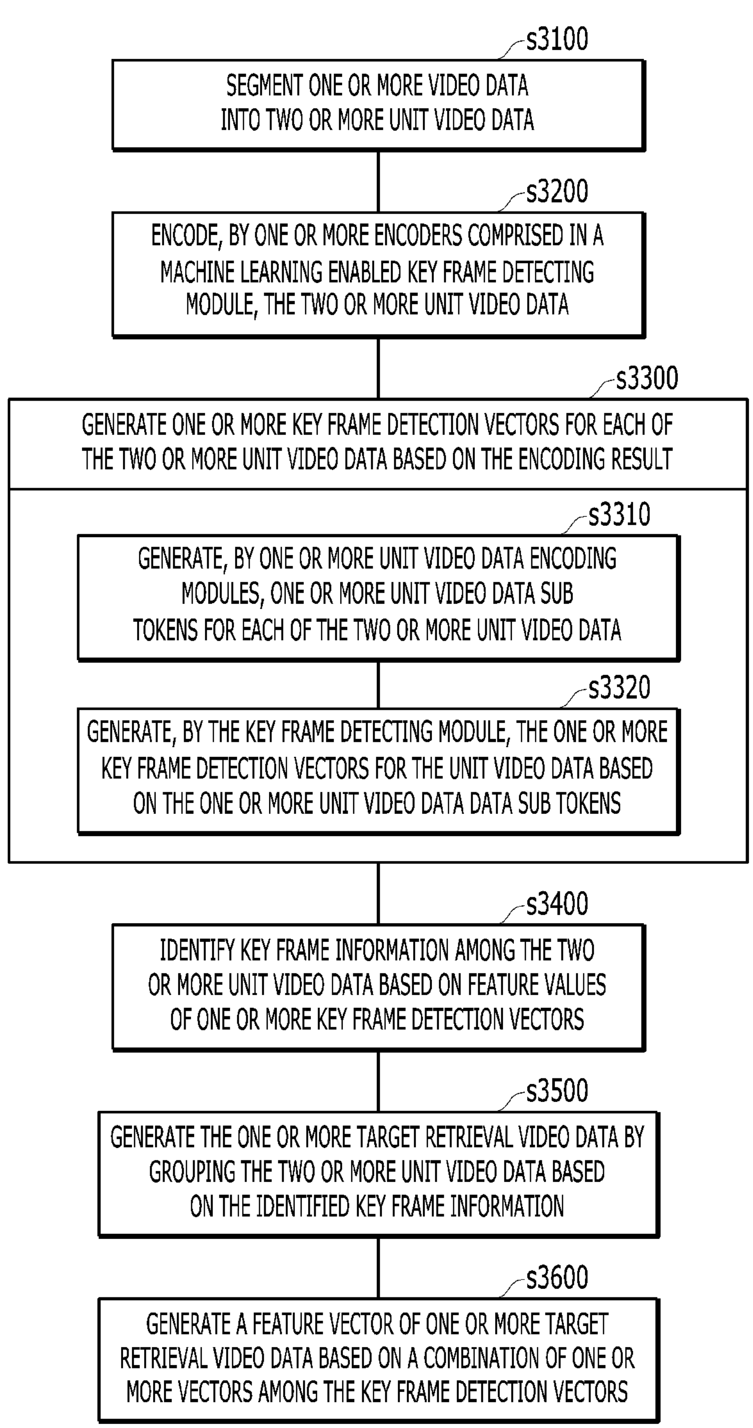
FIG. 18 is yet another exemplary flowchart illustrating a video retrieval method according to an exemplary embodiment of the present disclosure.

FIG. 18 is yet another exemplary flowchart illustrating a video retrieval method according to an exemplary embodiment of the present disclosure.

In the exemplary embodiment of the present disclosure, the video retrieval method may include an operation S3100 of segmenting one or more video data into two or more unit video data.

In the exemplary embodiment of the present disclosure, the video retrieval method may include an operation S3200 of encoding, by one or more encoders comprised in a machine learning enabled key frame detecting module, the two or more unit video data.

In the exemplary embodiment of the present disclosure, the video retrieval method may include an operation S3300 of generating one or more key frame detection vectors for each of the two or more unit video data based on the result of the encoding.

In the exemplary embodiment of the present disclosure, the operation S3300 of the identifying key frame information may further include an operation S3310 of generating, by one or more unit video data encoding modules, one or more unit video data sub tokens for each of the two or more unit video data and an operation S3320 of generating, by the key frame detecting module, one or more key frame detection vectors for the unit video data based on the one or more unit video data sub tokens.

In the exemplary embodiment of the present disclosure, the video retrieval method may include an operation S3400 of identifying key frame information among the two or more unit video data based on feature values of one or more key frame detection vectors.

In the exemplary embodiment of the present disclosure, the video retrieval method may include an operation S3500 of generating the one or more target retrieval video data by grouping the two or more unit video data based on the identified key frame information.

In the exemplary embodiment of the present disclosure, the video retrieval method may include an operation S3600 of generating a feature vector of one or more target retrieval video data based on a combination of one or more vectors among the key frame detection vectors.

Figure 19:
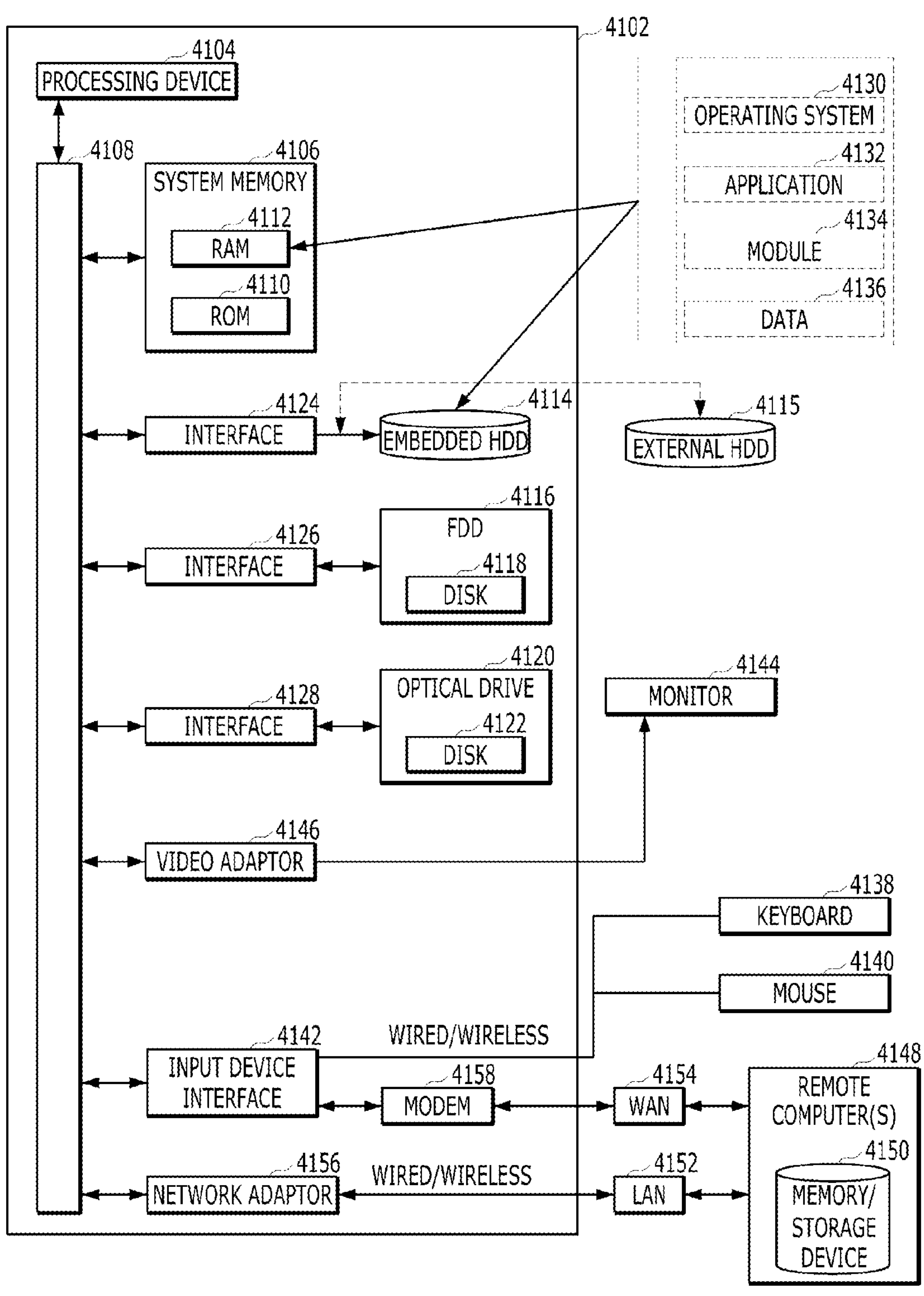
FIG. 19 is a general schematic diagram illustrating an example of a computing environment in which the exemplary embodiments of the present disclosure contents are implementable.

FIG. 19 is a general schematic diagram illustrating an example of a computing environment in which the exemplary embodiments of the present disclosure contents are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form.

Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transmission medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 4100 including a computer 4102 and implementing several aspects of the present disclosure is illustrated, and the computer 4102 includes a processing device 4104, a system memory 4106, and a system bus 4108. The system bus 4108 connects system components including the system memory 4106 (not limited) to the processing device 4104. The processing device 4104 may be a predetermined processor among various commonly used processors. A dual processor and other multiprocessor architectures may also be used as the processing device 4104.

The system bus 4108 may be a predetermined one among several types of bus structure, which may be additionally connectable to a local bus using a predetermined one among a memory bus, a peripheral device bus, and various common bus architectures. The system memory 4106 includes a ROM 4110, and a RAM 4112. A basic input/output system (BIOS) is stored in a non-volatile memory 4110, such as a ROM, an erasable and programmable ROM (EPROM), and an EEPROM, and the BIOS includes a basic routine helping a transport of information among the constituent elements within the computer 4102 at a time, such as starting. The RAM 4112 may also include a high-rate RAM, such as a static RAM, for caching data.

The computer 4102 also includes an embedded hard disk drive (HDD) 4114 (for example, enhanced integrated drive electronics (EIDE) and serial advanced technology attachment (SATA))—the embedded HDD 4114 being configured for exterior mounted usage within a proper chassis (not illustrated)—a magnetic floppy disk drive (FDD) 4116 (for example, which is for reading data from a portable diskette 4118 or recording data in the portable diskette 4118), and an optical disk drive 4120 (for example, which is for reading a CD-ROM disk 4122, or reading data from other high-capacity optical media, such as a DVD, or recording data in the high-capacity optical media). A hard disk drive 4114, a magnetic disk drive 4116, and an optical disk drive 4120 may be connected to a system bus 4108 by a hard disk drive interface 4124, a magnetic disk drive interface 4126, and an optical drive interface 4128, respectively. An interface 4124 for implementing an exterior mounted drive includes, for example, at least one of or both a universal serial bus (USB) and the Institute of Electrical and Electronics Engineers (IEEE) 1394 interface technology. The drives and the computer readable media associated with the drives provide non-volatile storage of data, data structures, computer executable commands, and the like. In the case of the computer 4102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 4130, one or more application programs 4132, other program modules 4134, and program data 4136 may be stored in the drive and the RAM 4112. An entirety or a part of the operation system, the application, the module, and/or data may also be cached in the RAM 4112. It will be well appreciated that the present disclosure may be implemented by several commercially usable operation systems or a combination of operation systems.

A user may input a command and information to the computer 4102 through one or more wired/wireless input devices, for example, a keyboard 4138 and a pointing device, such as a mouse 4140. Other input devices (not illustrated) may be a microphone, an IR remote controller, a joystick, a game pad, a stylus pen, a touch screen, and the like. The foregoing and other input devices are frequently connected to the processing device 4104 through an input device interface 4142 connected to the system bus 4108, but may be connected by other interfaces, such as a parallel port, an IEEE 1394 serial port, a game port, a USB port, an IR interface, and other interfaces.

A monitor 4144 or other types of display devices are also connected to the system bus 4108 through an interface, such as a video adaptor 4146. In addition to the monitor 4144, the computer generally includes other peripheral output devices (not illustrated), such as a speaker and a printer.

The computer 4102 may be operated in a networked environment by using a logical connection to one or more remote computers, such as remote computer(s) 4148, through wired and/or wireless communication. The remote computer(s) 4148 may be a work station, a computing device computer, a router, a personal computer, a portable computer, a microprocessor-based entertainment device, a peer device, and other general network nodes, and generally includes some or an entirety of the constituent elements described for the computer 4102, but only a memory storage device 4150 is illustrated for simplicity.

The illustrated logical connection includes a wired/wireless connection to a local area network (LAN) 4152 and/or a larger network, for example, a wide area network (WAN) 4154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 4102 is used in the LAN networking environment, the computer 4102 is connected to the local network 4152 through a wired and/or wireless communication network interface or an adaptor 4156. The adaptor 4156 may make wired or wireless communication to the LAN 4152 easy, and the LAN 4152 also includes a wireless access point installed therein for the communication with the wireless adaptor 4156. When the computer 4102 is used in the WAN networking environment, the computer 4102 may include a modem 4158, is connected to a communication computing device on a WAN 4154, or includes other means setting communication through the WAN 4154 via the Internet. The modem 4158, which may be an embedded or outer-mounted and wired or wireless device, is connected to the system bus 4108 through a serial port interface 4142.

In the networked environment, the program modules described for the computer 4102 or some of the program modules may be stored in a remote memory/storage device 4150.

The illustrated network connection is illustrative, and those skilled in the art will appreciate well that other means setting a communication link between the computers may be used.

The computer 4102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

In the meantime, according to an exemplary embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of pieces of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include data pre-processed by the processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may also include all or a predetermined combination of preprocessed data for processing by the neural network, data input to the neural network, a weight of the neural network, a hyper-parameter of the neural network, data obtained from the neural network, an active function associated with each node or layer of the neural network, and a loss function for training of the neural network. In addition to the foregoing configurations, the data structure including the neural network may include predetermined other information determining a characteristic of the neural network.

Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons". The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing.

The foregoing data structure is merely an example, and the present disclosure is not limited thereto.

The data structure may include a weight of the neural network. (in the present specification, weights and parameters may be used with the same meaning.) Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes.

The foregoing data structure is merely an example, and the present disclosure is not limited thereto.

For a non-limited example, the weight may include a weight varied in the neural network training process and/or the weight when the training of the neural network is completed.

The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user.

The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Those skilled in the art will appreciate that the various illustrative logical blocks, modules, processors, means, circuits, and algorithm operations described in relationship to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software.

Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Therefore, the present disclosure is not limited to the exemplary embodiments presented herein, and shall be interpreted in the broadest range consistent with the principles and the new characteristics presented herein.

What is claimed is:

1. A video retrieval method performed by a computing device, the video retrieval method comprising:

identifying, by a machine learning enabled key frame detecting module having one or more encoders, key frame information for one or more video data based on one or more encoded vectors respectively generated from one or more unit video data included in the one or more video data;

segmenting the one or more video data into one or more target retrieval video data based on the identified key frame information; and generating, by a machine learning enabled retrieval vector generating module having one or more retrieval video encoding modules, one or more retrieval video vectors respectively representing the one or more target retrieval video data, wherein the generating further comprising:

for each target retrieval data, generating, by the one or more retrieval video encoding modules, two or more different domain-based retrieval video embedding tokens corresponding to the target retrieval video data, wherein the two or more different domain-based retrieval video embedding tokens are generated based on two or more data domains included in the target retrieval video data, and generating the one or more retrieval video vectors from the two or more different domain-based retrieval video embedding tokens of the one or more target retrieval video data, comprising:

generating a time embedding token for a position, combining the two or more different domain-based retrieval video embedding tokens and the time embedding token to generate a combined token, and generating a retrieval video vector in the one or more retrieval vectors by applying a retrieval token encoder to the combined token.

2. The video retrieval method of claim 1, wherein the one or more retrieval video encoding modules generates one or more retrieval video embedding tokens corresponding to one or more retrieval video data, respectively, for the one or more segmented target retrieval video data.

3. The video retrieval method of claim 2, wherein the one or more retrieval video encoding modules generate two or more retrieval video embedding tokens based on a same data domain included in the one or more target retrieval video data.

4. The video retrieval method of claim 2, wherein the generating of the retrieval video vector includes dividing each of the one or more segmented target retrieval video data into a plurality of unit retrieval video data.

5. The video retrieval method of claim 4, wherein the generating of the retrieval video vector includes generating a temporal embedding token based on time information included in each of the plurality of unit retrieval video data.

6. The video retrieval method of claim 1, further comprising:

storing one or more retrieval video vectors corresponding to the retrieval video data in a video retrieval index database.

7. A non-transitory computer-readable storage medium storing a computer program, in which when the computer program is executed in one or more processors, the computer program causes the one or more processors to perform operations for performing a video retrieval method, the video retrieval method comprising:
- identifying, by a machine learning enabled key frame detecting module having one or more encoders, key frame information for one or more video data based on one or more encoded vectors respectively generated from one or more unit video data included in the one or more video data;
- segmenting the one or more video data into one or more target retrieval video data based on the identified key frame information; and
- generating, by a machine learning enabled retrieval vector generating module having one or more retrieval video encoding modules, one or more retrieval video vectors respectively representing the one or more target retrieval video data, wherein the generating further comprising:
  - for each target retrieval data, generating, by the one or more retrieval video encoding modules, two or more different domain-based retrieval video embedding tokens corresponding to the target retrieval video data, wherein the two or more different domain-based retrieval video embedding tokens are generated based on two or more data domains included in the target retrieval video data, and
  - generating the one or more retrieval video vectors from the two or more different domain-based retrieval video embedding tokens of the one or more target retrieval video data, comprising:
    - generating a time embedding token for a position,
    - combining the two or more different domain-based retrieval video embedding tokens and the time embedding token to generate a combined token, and
    - generating a retrieval video vector in the one or more retrieval video vectors by applying a retrieval token encoder to the combined token.

8. A computing device performing a video retrieval method, the computing device comprising:
- a processor including at least one core; and
- a memory including program codes executable in the processor,
- wherein the processor:
- identifies, by a machine learning enabled key frame detecting module having one or more encoders, key frame information for one or more video data based on one or more encoded vectors respectively generated from one or more unit video data included in the one or more video data,
- segments the one or more video data into one or more target retrieval video data based on the identified key frame information, and
- generates by a machine learning enabled retrieval vector generating module having one or more retrieval video encoding modules, one or more retrieval video vectors respectively representing the one or more target retrieval video data, wherein to generate the one or more retrieval video vectors, the processor:
  - for each target retrieval data, generate, by the one or more retrieval video encoding modules, two or more different domain-based retrieval video embedding tokens corresponding to the target retrieval video data, wherein the two or more different domain-based retrieval video embedding tokens are generated based on two or more data domains included in the target retrieval video data, and
  - generate the one or more retrieval vectors from the two or more different domain-based retrieval video embedding tokens of the one or more target retrieval video data, wherein the processor further:
    - generates a time embedding token for a position,
    - combines the two or more different domain-based retrieval video embedding tokens and the time embedding token to generate a combined token, and
    - generates a retrieval video vector in the one or more retrieval video vectors by applying a retrieval token encoder to the combined token.

* * * * *